(12) United States Patent
Balk et al.

(10) Patent No.: US 10,054,404 B2
(45) Date of Patent: Aug. 21, 2018

(54) AREA DENIAL COMMUNICATION LATENCY COMPENSATION

(71) Applicant: ORBITAL ATK, INC., Plymouth, MN (US)

(72) Inventors: Michael J. Balk, Shoreview, MN (US); Larry G. Linde, Andover, MN (US)

(73) Assignee: ORBITAL ATK, INC., Plymouth, MN (US)

( * ) Notice: Subject to any disclaimer, the term of this patent is extended or adjusted under 35 U.S.C. 154(b) by 0 days.

(21) Appl. No.: 15/838,213

(22) Filed: Dec. 11, 2017

(65) Prior Publication Data

US 2018/0167132 A1 Jun. 14, 2018

Related U.S. Application Data

(60) Provisional application No. 62/432,003, filed on Dec. 9, 2016.

(51) Int. Cl.

| H04B 7/185 | (2006.01) |
| F42B 22/24 | (2006.01) |
| F42B 23/24 | (2006.01) |
| F41H 13/00 | (2006.01) |
| H04W 88/16 | (2009.01) |

(Continued)

(52) U.S. Cl.
CPC .............. *F41H 13/00* (2013.01); *F41G 3/32* (2013.01); *F41G 9/00* (2013.01); *F42B 22/24* (2013.01); *F42B 23/24* (2013.01); *G05D 1/0094* (2013.01); *H04B 7/18506* (2013.01); *H04W 88/16* (2013.01); *B64C 39/024* (2013.01); *B64C 2201/12* (2013.01); *F41A 17/06* (2013.01)

(58) Field of Classification Search
CPC ...... H04B 7/18506; F42B 22/24; F42B 23/24; F41H 13/00; B64C 39/024; B64C 2201/12; F41A 17/06; H04W 88/16; F41G 3/32; F41G 9/00; G05D 1/0094
See application file for complete search history.

(56) References Cited

U.S. PATENT DOCUMENTS

| 5,140,891 | A | * | 8/1992 | Husseiny | ................ | F42B 33/06 |
| | | | | | | 102/402 |
| 5,223,661 | A | * | 6/1993 | Sabri | ...................... | F42B 33/06 |
| | | | | | | 89/1.1 |

(Continued)

*Primary Examiner* — Russell Frejd
(74) *Attorney, Agent, or Firm* — Christensen, Fonder, Dardi & Herbert PLLC

(57) ABSTRACT

An area denial system may be operationally placed with communication latency compensation. The area denial system may include a plurality of munitions, one or more sensor devices, and a command and control unit, networked together and having a command and control latency for communication between the command and control unit and the remainder of the area denial system. Latency compensation may include determining a first target position, determining a first predicted position area for the target using the command and control latency and the first target position, receiving an authorization to arm one or more of the munitions, determining a second target position, and determining that the second target position is outside a threshold distance from a first authorized munition of the one or more authorized munitions, and in response, de-authorizing the first authorized munition.

20 Claims, 20 Drawing Sheets

(51) Int. Cl.
*F41G 3/32* (2006.01)
*F41G 9/00* (2006.01)
*G05D 1/00* (2006.01)
*F41A 17/06* (2006.01)
*B64C 39/02* (2006.01)

(56) References Cited

U.S. PATENT DOCUMENTS

| | | | |
|---|---|---|---|
| 5,249,500 A * | 10/1993 | Husseiny | F42B 33/06 89/1.1 |
| 5,489,909 A | 2/1996 | Dittmann et al. | |
| 5,941,708 A * | 8/1999 | FitzGerald | F41G 3/26 434/11 |
| 6,142,411 A | 11/2000 | Cobleigh | |
| D461,159 S | 8/2002 | Miralles et al. | |
| 6,903,676 B1 | 6/2005 | Frady et al. | |
| 7,305,467 B2 | 12/2007 | Kaiser et al. | |
| 7,574,168 B2 * | 8/2009 | Twitchell, Jr. | G01S 19/03 342/357.4 |
| 7,783,246 B2 * | 8/2010 | Twitchell, Jr. | G01S 19/03 342/357.4 |
| 7,886,648 B2 * | 2/2011 | Williams | F41H 13/0031 119/908 |
| 8,020,481 B1 * | 9/2011 | Beckwith | F41H 13/00 235/400 |
| 8,087,335 B2 * | 1/2012 | Shekarri | F41H 13/0031 119/908 |
| 8,812,654 B2 | 8/2014 | Gelvin et al. | |
| 8,832,244 B2 | 9/2014 | Gelvin et al. | |
| 8,836,503 B2 | 9/2014 | Gelvin et al. | |
| 9,014,975 B2 * | 4/2015 | Brashear | G01C 21/165 701/472 |
| 9,108,713 B2 | 8/2015 | Tao et al. | |
| 9,187,184 B2 | 11/2015 | Miralles et al. | |
| 9,211,947 B2 | 12/2015 | Miralles | |
| 9,528,802 B1 * | 12/2016 | Markowitch | F42B 12/36 |
| 2009/0229160 A1 * | 9/2009 | Elliott | F41A 23/04 42/73 |
| 2010/0042269 A1 | 2/2010 | Kokkeby et al. | |
| 2010/0259614 A1 * | 10/2010 | Chen | G05D 1/0038 348/148 |
| 2015/0203201 A1 | 7/2015 | Tao et al. | |
| 2016/0185445 A1 | 6/2016 | Miralles et al. | |
| 2016/0347476 A1 | 12/2016 | Andryukov | |
| 2017/0021945 A1 | 1/2017 | Fisher et al. | |

* cited by examiner

AREA DENIAL COMMUNICATION LATENCY COMPENSATION

RELATED APPLICATIONS

This application claims the benefit of U.S. Provisional Patent Application No. 62/432,003, filed Dec. 9, 2016, the disclosure of which is incorporated by reference herein in its entirety.

TECHNICAL FIELD

The present disclosure relates to area denial systems, and more specifically, to communication latency compensation for networked munitions in an area denial system.

BACKGROUND

Area denial systems generally include a plurality of lethal or non-lethal munitions that can be deployed as a defensive system to deny access to terrain, to focus or direct enemy movement, reduce enemy morale, or to accomplish other various tactical objectives. In addition, certain area denial systems can be deeply deployed into enemy territory, quickly placed in front of moving formations of enemy units, or quickly deployed for other purposes via artillery scatterable and aircraft scatterable munitions.

As referred to herein, the term munitions includes various devices, apparatuses, and the like that include explosive ordinance or a weapon system that is designed for targeting enemy personnel, vehicles, tanks, aircraft, ships, or the like. As such, munitions can include various land based or water based weapon systems designed to detonate or otherwise engage a target when a target is in range. In addition, the term munition includes various air based devices, such as drones, air based vehicles, or the like. For example, munitions could include the various devices described in U.S. Pat. Nos. 9,108,713; 9,187,184; and 9,211,947; in U.S. Design Pat. No. D461,159; and in U.S. Patent Publications 2015/0203201; 2016/0185445; 2016/0347476; and 2017/0021945. These patents and publications are incorporated herein by reference for all purposes.

Known munition systems, such as the M-7 Spider and the XM1100 Scorpion, include a plurality of networked munitions, sensors, and communication devices. Once these systems are deployed, a human operator at a remotely located control station can choose to fire one or more of the munitions, for example in response to feedback from the sensors that indicates the presence of an enemy target. Networking elements for remote control of sensors and other devices, such as munitions, is well known in the art. See for example, U.S. Pat. Nos. 8,832,244; 8,836,503; 8,812,654; 7,305,467; and 5,489,909, each incorporated herein by reference for all purposes.

Modern area denial systems which utilize anti-personnel munitions are generally configured for "human in the loop" operation of the anti-personnel munitions, requiring human authorization of fire commands for the munitions in the system. In addition, known area denial systems which utilize anti-vehicle munitions generally include human in the loop operated anti-personnel munitions to make removal of the anti-vehicle munitions more difficult.

However, proper execution of an area denial system utilizing human in the loop configured munitions can be difficult, requiring proper set up and consideration of various technical issues that are necessitated by long range remote control of the networked sensors and munitions. As such, an area denial system that improves or resolves those technical issues, and/or improves the efficiency of area denial systems utilizing human in the loop operated munitions would be well received.

SUMMARY

Embodiments of the disclosure are directed to methods, systems, and computer program product for communication latency compensation in an area denial system. In one or more embodiments, the area denial system includes a plurality of munitions, one or more sensor devices, a command and control unit or station, and one or more gateway devices. The plurality of munitions may be deployed within a geographic region to define an obstacle field or obstacle region that can disrupt enemy personnel and/or vehicle movements in the geographic region. In addition, the one or more sensor devices and the one or more gateway devices may be deployed within the geographic region and/or the obstacle field for target detection and tracking, establishing networking capabilities, or for other area denial objectives. However, the command and control unit may be generally stationed outside of the region or otherwise stationed remotely to the obstacle field to allow for deep operating ranges of the munitions and to keep human operators of the system away from potential harm.

In various embodiments, the elements of the area denial system are networked together via the one or more gateway devices in an area denial network that provides for data communication between the elements in the system. However, in various embodiments, because the command and control unit is located remotely to the munitions, sensor devices, and gateways, data communication between the command and control unit and the other elements can suffer communication latency as compared to communication between the sensor devices, munitions, and/or gateways.

As such, embodiments of the disclosure provide benefits to area denial systems from enhanced effectiveness against both vehicle and personnel targets in the presence of command and control communication latencies. Further, various embodiments are especially relevant for deeply deployed area denial systems with tens to hundreds of kilometers between the command and control unit and the obstacle field, which can result in significant communication latencies between command and control unit and the other elements of the system.

Known systems, such as those utilizing the M-7 Spider or the XM1100 Scorpion, do not account for such latencies. As a result, known systems may suffer from reduced effectiveness as operator instructions, such as authorizations to fire or arm a munition, are delayed in getting to selected munitions. For example, a human operator could receive information indicating that a target is in the range of a munition. In response the human operator can transmit authorization to the munition from a command and control unit that is positioned several kilometers away. As a result of the distance between the human operator and the selected munition, several moments pass before the munition receives the transmitted authorization communication. In some instances, for example when a target is moving, by the time the selected munition receives authorization the target is now further away from the authorized munition, reducing the probability of a successful target engagement. In some instances the reduction in effectiveness can even be to the point where the target is completely outside the range of the authorized munition. In addition, while the human operator could select several munitions to fire with the hope that at least some of the authorized munitions will engage the target, it possible that this will unnecessarily waste munitions that, by the time the munition receives authorization, are too far from the target for a successful engagement, thus reducing the number of munitions and the effectiveness of the obstacle field. Various embodiments also provide an additional safety factor for noncombatants by ensuring that munitions are not detonated on noncombatants moving through the obstacle field prior to the enemy's arrival.

Further, one or more embodiments provide benefits from latency compensation that is compliant with United States landmine policies, requiring that fire authorization messages to munitions targeting enemy personnel are sent solely from a human operator or "human in the loop". This results in additional benefits in that various embodiments eliminate the need to mix anti-personnel munitions with anti-vehicle munitions as latency compensation allows for human in the loop commanded detonation of anti-vehicle munitions to effectively engage moving vehicles while additionally allowing for human in the loop commanded detonation of traditionally anti-vehicle munitions to protect the obstacle field from enemy personnel trying to disrupt the field. As a result, a single munition type can be used to create the obstacle field, reducing the total lifecycle costs of the system.

In addition, one or more embodiments provide benefits to deeply deployed or quickly deployed area denial systems, such as those deployed via artillery scatterable or aircraft scatterable munitions, which are generally deployed long distances from human operators or which utilize higher latency types of communication between the munitions and the human operators.

Accordingly, one or more embodiments of the disclosure are directed to a method for communication latency compensation in an area denial system deployed in a region. In one or more embodiments, the area denial system includes a plurality of munitions defining an obstacle field, one or more sensor devices, and a command and control unit, networked together, via one or more gateway devices, in an area denial network having a command and control latency for communication between the command and control unit and the remainder of the area denial system. In one or more embodiments, the method includes detecting, using the one or more sensor devices, a target for the area denial system. In certain embodiments the detecting includes determining a first target position relative to the obstacle field.

In various embodiments the method includes determining a first predicted position area for the target. In certain embodiments the first predicted position area indicates a range of possible locations for the target using the command and control latency and us determined using the detected first target position.

In one or more embodiments, the method includes determining one or more recommended munitions of the plurality of munitions, where the one or more recommended munitions are determined using the first predicted position area for the target. In certain embodiments the method includes notifying one or more human operators, via the command control unit, of the one or more recommended munitions.

In one or more embodiments, the method includes receiving, from at least one of the one or more human operators, via the command and control unit, authorization to arm one or more munitions. In various embodiments, the method includes determining a second target position area for the target. And in one or more embodiments, the method includes determining that the second target position is outside a threshold distance from a first authorized munition of the one or more authorized munitions, and in response, de-authorizing the first authorized munition.

In certain embodiments, the method includes determining that the second target position is within a threshold distance from a first authorized munition of the one or more authorized munitions, and in response, maintaining authorization of the first authorized munition.

One or more embodiments are directed to an area denial system for deployment in a region. In certain embodiments the system includes a plurality of munitions, one or more sensor devices, a command and control unit, and one or more gateway devices. In various embodiments the plurality of munitions the one or more sensor devices and the command and control unit are networked together via the one or more gateway devices in an area denial network having a command and control latency for communication between the command and control unit and the remainder of the area denial system.

In one or more embodiments, the command and control unit and the one or more gateways devices each include a processor and a computer readable storage medium communicatively connected to the processor, the computer readable storage mediums having program instructions embodied therewith.

In certain embodiments, the program instructions are executable by the respective processors to cause the respective processors to detect, using the one or more sensor devices, a target for the area denial system, the detecting including determining a first target position relative to the obstacle field.

In certain embodiments, the program instructions are executable by the respective processors to cause the processors to determine a first predicted position area for the target, the first predicted position area indicating a range of possible locations for the target using the command and control latency and using the first target position.

In certain embodiments, the program instructions are executable by the respective processors to cause the processors determine one or more recommended munitions of the plurality of munitions, the one or more recommended munitions determined using the first predicted position area for the target, and to notify one or more human operators, via the command control unit, of the one or more recommended munitions.

In certain embodiments, the program instructions are executable by the respective processors to cause the processors to receive, from at least one of the one or more human operators via the command and control unit, authorization to arm one or more munitions of the plurality of munitions. In certain embodiments, the program instructions are executable by the respective processors to cause the processor or the group of processors to determine a second predicted position area for the target, the second predicted position area using a second detected target position. In one or more embodiments, the program instructions are executable by the respective processors to cause the processor or the group of processors to determine that the second predicted location area is outside a threshold distance from a first authorized munition of the one or more authorized munitions, and in response, de-authorizing the first authorized munition.

One or more embodiments are directed to a computer program product for communication latency compensation in an area denial system deployed in a region, the area denial system including a plurality of munitions defining an obstacle field, one or more sensor devices, and a command and control unit, networked together, via one or more gateway devices, in an area denial network having a command and control latency for communication between the command and control unit and the remainder of the area denial system. In one or more embodiments the computer program product includes a computer readable storage medium having program instructions embodied therewith, where the computer readable storage medium is not a transitory signal per se. In various embodiments the program instructions are executable by a processor.

In one or more embodiments the program instructions include authorization filter means to receive authorization messages to fire one or more munitions of the plurality of munitions. In certain embodiments the program instructions include authorization filter means to receive target sensor data from the one or more sensor devices. In various embodiments the program instructions include authorization filter means to determine a predicted position area for the target, the predicted position area using the target sensor data. In one or more embodiments the program instructions include authorization filter means to determine that the predicted position area is outside a threshold distance from a first authorized munition of the one or more authorized munitions, and in response, de-authorize the first authorized munition.

In embodiments, the area denial system includes a multiplicity of munitions dispersed in the obstacle field. In embodiments, the area denial system includes more than 20 dispersed munitions. In embodiments the area denial system includes more than 40 munitions. In embodiments of the system the area denial system includes from 15 to 50 munitions. In embodiments of the system, the sensors are separate from the munitions, and there are a plurality of such sensors. In embodiments of the system, each of the munitions are structurally separated from the other munitions. In embodiments of the system, the average separation between each munition and the next closest munition is at least 5 meters. In other embodiments the average separation between each munition and the next closest munition is at least 10 meters. In embodiments the average separation between each munition and the next closest munition is between 5 and 30 meters. In embodiments the system has at least two sensors structurally not connected and dispersed from each other. In embodiments a sensor is a camera. In embodiments, the munitions are not physically connected to each other nor are they physically connected to the sensors.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
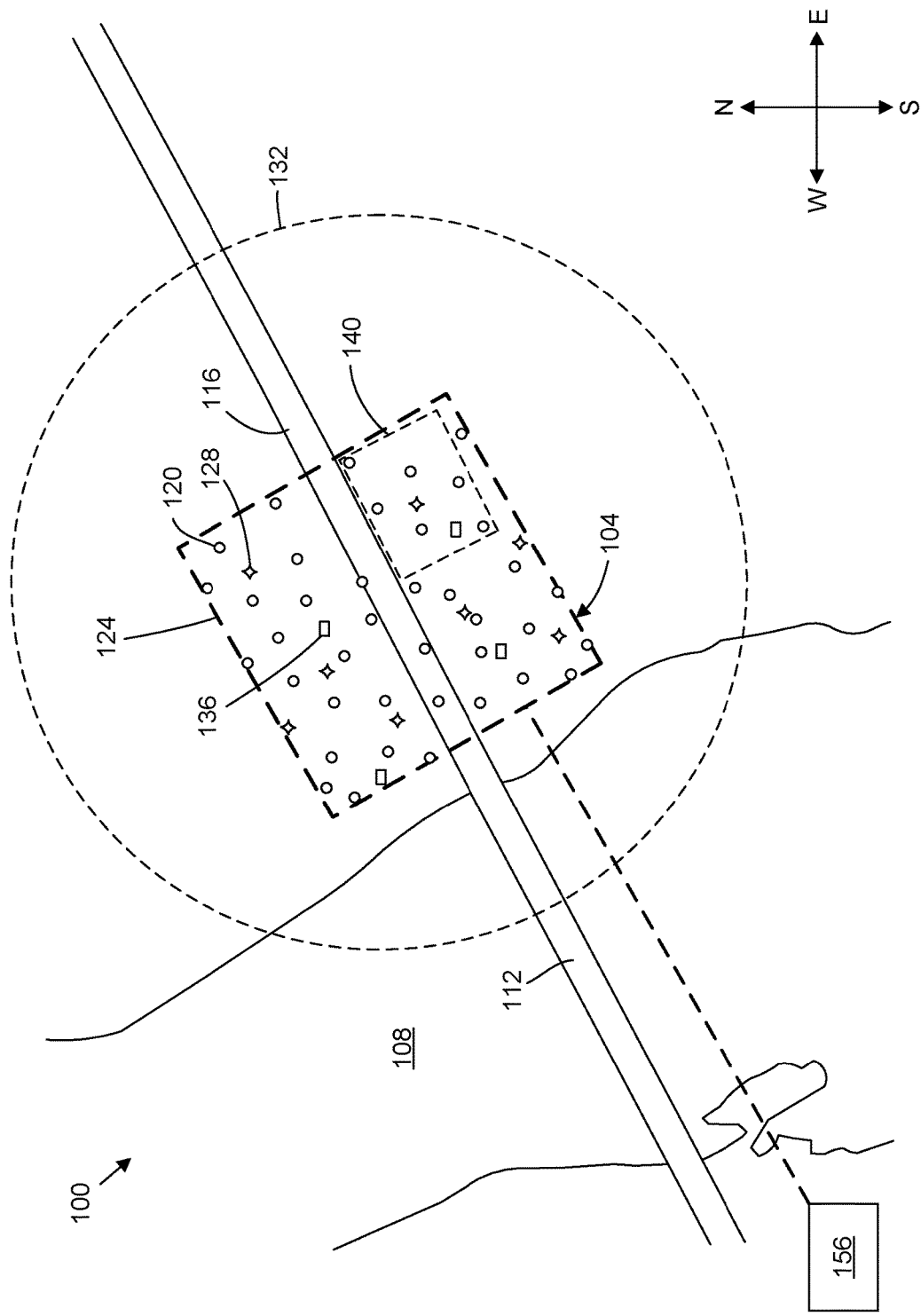
FIG. 1A depicts a top down view of an area denial system deployed in a geographic region, according to one or more embodiments of the disclosure. In embodiments, a user interface may have such a view.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

FIG. 1A depicts a top down plan view of a geographic region 100 with an area denial system 104, according to one or more embodiments of the disclosure. Geographic region 100 represents a hypothetical region including various geographical and/or man-made features. For example, FIG. 1A depicts a geographic region 100 including a river 108 with a bridge 112 and road 116. To deny enemy maneuvers across the bridge 112, an obstacle in the form of the area denial system 104 is deployed over a portion of the road 116 and adjacent to the bridge 112 thereby blocking and/or disrupting enemy movements across the river 108.

In various embodiments, the area denial system 104 includes a plurality of munitions 120 which are deployed in the geographic region 100 and define an obstacle field 124 or obstacle region. For purposes of illustration, obstacle field 124 is denoted by a dashed rectangular region that includes each of the plurality of munitions 120. In one or more embodiments, the munitions 120 include anti-vehicle munitions that are configured to engage with various types of armored or un-armored vehicles. In certain embodiments, munitions 120 include anti-personnel munitions that are configured to engage with enemy personnel. In some embodiments, the munitions 120 include both anti-vehicle and anti-tank munitions, or include munitions that are configured with capability to engage with both vehicles and with personnel. In one or more embodiments, munitions 120 are scatterable munitions that are remotely deployable such as, for example, by artillery shell or aircraft. In certain embodiments, munitions 120 are hand deployable munitions.

Obstacle field 124 is depicted in FIG. 1A as a 100 meter (m) by 100 m rectangular square having a munition density of about 0.004 mines per square meter portion of the obstacle field 124. However, in various embodiments, obstacle field 124 can be any suitable size with any suitable munition density. For example, in various embodiments, munitions 120 can be added, upgraded, or removed from the area denial system 104 to alter the size of the obstacle field 124, alter the munition density, or alter the capabilities of the area denial system 104 to suit various system/tactical objectives.

In one or more embodiments, area denial system 104 includes sensor devices 128. Sensor devices 128, in various embodiments, includes one or more of cameras, thermographic imaging devices, magnetic sensors, motion sensors, tripwires, microphones, and any other suitable sensor for detecting and/or tracking a target. In certain embodiments, sensor devices 128 can be configured to detect the presence of and/or track the position of one or more of animal, personnel, vehicle, mechanical, or other targets, relative to the position of the sensor device 128. In certain embodiments, sensor devices 128 are able to autonomously differentiate between personnel and vehicle targets.

In various embodiments, the sensor devices 128 have a sensor range, depicted in FIG. 1A as a dashed circle 132 that denotes the area of the geographic region 100 where sensor devices 128 are cable of detecting and/or tracking targets. In one or more embodiments, the sensor range will extend outside of the obstacle field 124 to detect targets as they approach the obstacle field 124 and prior to entry into obstacle field 124. In certain embodiments, once a target is detected, the sensor devices 128 are configured to then track the position of the target and continually update the system on the position and status of the target. In various embodiments, once a target is detected, the sensor devices 128 are configured to track the target until the target is either eliminated, leaves the detection range of the sensor devices 128, or otherwise becomes undetected by the sensor devices 128.

The sensor range is depicted in FIG. 1A as a circle 132 having a radius of about 150 meters. However, in various embodiments, the sensor range can have a range and/or shape that varies depending upon the position, number, and type of sensor devices 128. For example, certain sensor devices 128 may have different detection ranges compared to other sensors. Similarly, certain sensor devices 128 may have different positions in the geographic region 100. In addition, sensor devices 128 may be more numerous in some areas than in others. As such, the sensor range can have various shapes, such as rectangular, triangular, or other uniform or non-uniform shape that is based on the position, number, and type of sensor devices 128 in the system 104.

In one or more embodiments, area denial system 104 includes one or more gateway devices 136. Gateway devices 136 are networking nodes that are each configured as a router, switch, or gateway for allowing data communication between elements of the area denial system 104. As such, in one or more embodiments, the one or more gateway devices 136 provide for networking between the plurality of munitions 120, sensor devices 128, and other elements in area denial system 104.

In one or more embodiments, each of the gateway devices 136 are configured to maintain a network between some portion of the munitions 120 and the sensor devices 128 within the system 104. As such, in certain embodiments, the system 104 includes a plurality of the gateway devices 136 which are distributed in the geographic region 100 and which each handle the networking of different elements among the total number of elements in the system 104.

Figure 2:
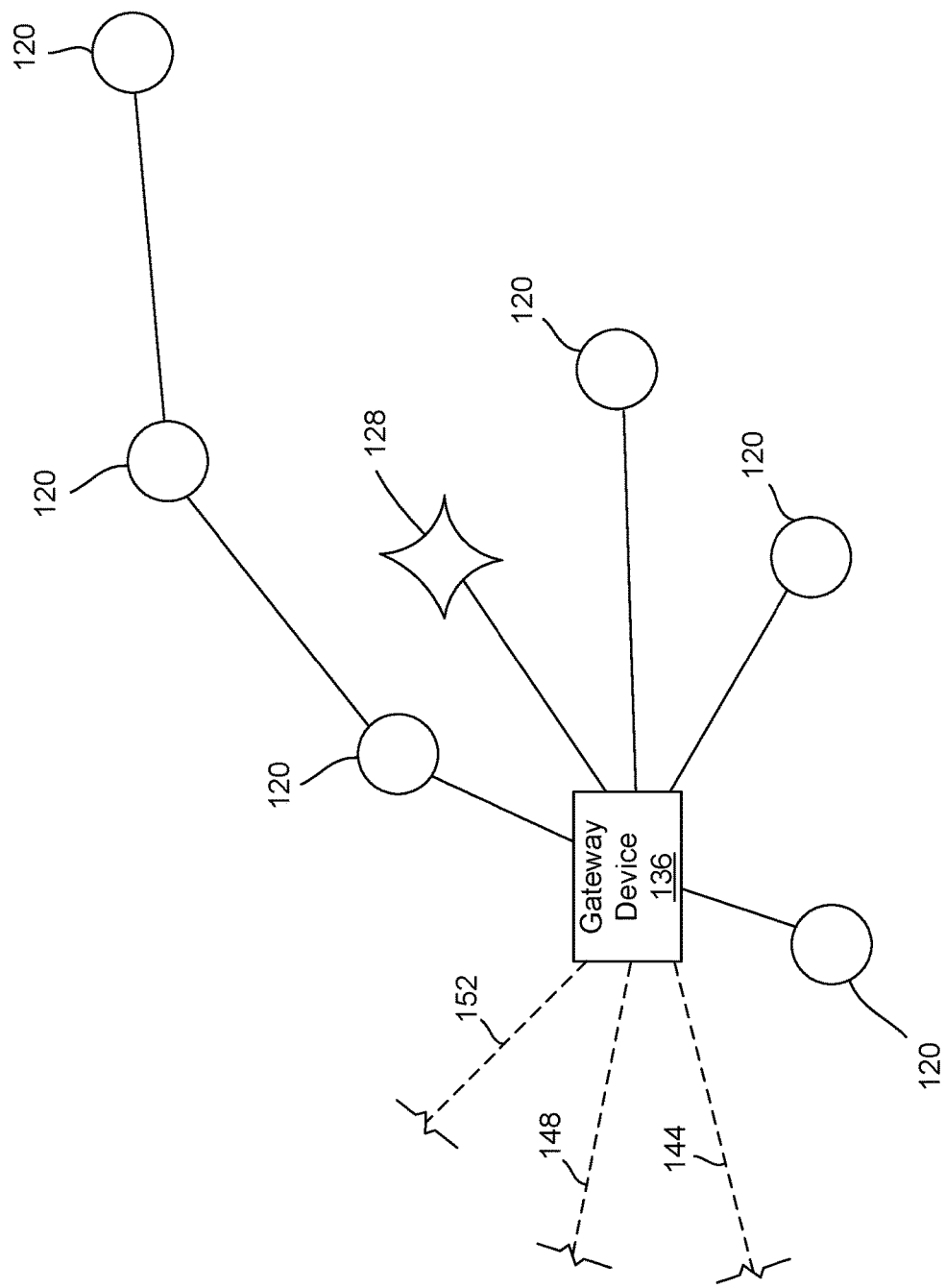
FIG. 2 depicts a portion of an area denial network including munitions and sensor devices of the area denial system, according to one or more embodiments of the disclosure.

For example, depicted in FIG. 1A, four gateway devices 136 are positioned in the geographic region 100. Each of the gateway devices 136 are networked with some portion of the plurality of munitions 120 and/or with some portion of the plurality of sensor devices 120. Referring to FIGS. 1A and 2, a close up view of area 140 is depicted. Gateway device 136 is networked with six of the munitions 120 in the obstacle field 124 and is networked with one sensor device 128. As a result, the remaining three gateway devices 136 will be networked with the remaining munitions 120 and sensor devices 128. In addition, in one or more embodiments, the gateway device 136 is networked with each of the three remaining gateway devices 136 via connections 144, 148, 152 to establish a complete network between the total number of the sensor devices 128 and munitions 120 in the system 104.

Depicted in FIG. 2, the gateway device 136 is networked with the munitions 120 and sensor 128 utilizing a mesh network topology, where each of the munitions 120, sensor devices 128, and gateway device are configured to connect directly, dynamically and non-hierarchically to as many other nodes as possible and cooperate with one another to efficiently route data within the system. However, in various embodiments the elements of the system can be networked utilizing any suitable type of network topology, such as for example, star network, tree network, ring network, or the like.

In various embodiments, munitions 120, sensor devices 128, and other elements can be assigned to network with particular gateway devices 136 within the system 104 based on various factors such as proximity, latency, redundancy, technical requirements/limitations of the gateway devices 136, and other factors. In some embodiments the gateway devices 136 can be included as a part of one or more of the munitions 120 and/or the sensor devices 128.

In various embodiments, gateway devices 136 are configured for wireless communication between elements of the system 104. Wireless communication, as referred to herein, is any form of communication where data is transmitted as a signal through the air. As such, in certain embodiments, gateway devices 136 can utilize various forms of wireless communication including Wi-Fi, Li-Fi, Bluetooth®, radio waves, or other wireless signals. In certain embodiments, the gateway devices 136 are configured for wired communication. Wired communication, as used herein, is any form of communication where data is transmitted as a signal across a wire, optical fiber, or other physical medium. In certain embodiments, the gateway devices 136 are configured for a combination of wired and wireless communication. For example, in some embodiments, the gateway devices 136 could establish a wireless signal between various munitions while utilizing wired connections between other gateway devices 136. In some embodiments, the gateway devices 136 could use both wireless and wired connections to between elements of the system as a redundancy in case of wireless or wired communication error.

Referring back to FIG. 1A, in one or more embodiments, the area denial system 104 includes a command and control unit 156. In various embodiments, command and control unit 156 is a control system or computer configured for control of the plurality of munitions 120, sensor devices 128, and/or other devices in the area denial system 104. As such, in various embodiments, the command and control unit 156 is networked with the plurality of munitions 120 and sensor devices 128 for communication via the one or more of the gateway devices 136. In one or more embodiments, the command and control unit 156 is located away from the obstacle field 124 and is additionally configured for remote control of the area denial system 104.

In some embodiments the command and control unit 156 can be a relatively short distance from the obstacle field 124. For example, depicted in FIG. 1A, command and control unit 156 is depicted less than 200 m from the obstacle field 124. However, the command and control unit 156 can be located any suitable distance from the obstacle field 124. For example, in certain embodiments, the command and control unit 156 is located between ten to one hundred kilometers from the obstacle field 124. In some embodiments, the command and control unit 156 is located between ten to two hundred kilometers from the obstacle field 124. In various embodiments, the command and control unit is at least 20 kilometers from the obstacle field. In one or more embodiments, the command and control unit is at least 100 kilometers from the obstacle field.

However, in certain embodiments the command and control unit 156 can be positioned a shorter distance or longer distance from the obstacle field 156. In various embodiments, the command and control unit 156 can utilize various long haul network relay options for long range communication with the obstacle field 124. For example, the command and control unit 156 can utilize ground relays, airborne relays, or space based relays, such as low earth orbit communication satellites to relay communications back and forth between the command and control unit 156 and the obstacle field 124.

Figure 1B:
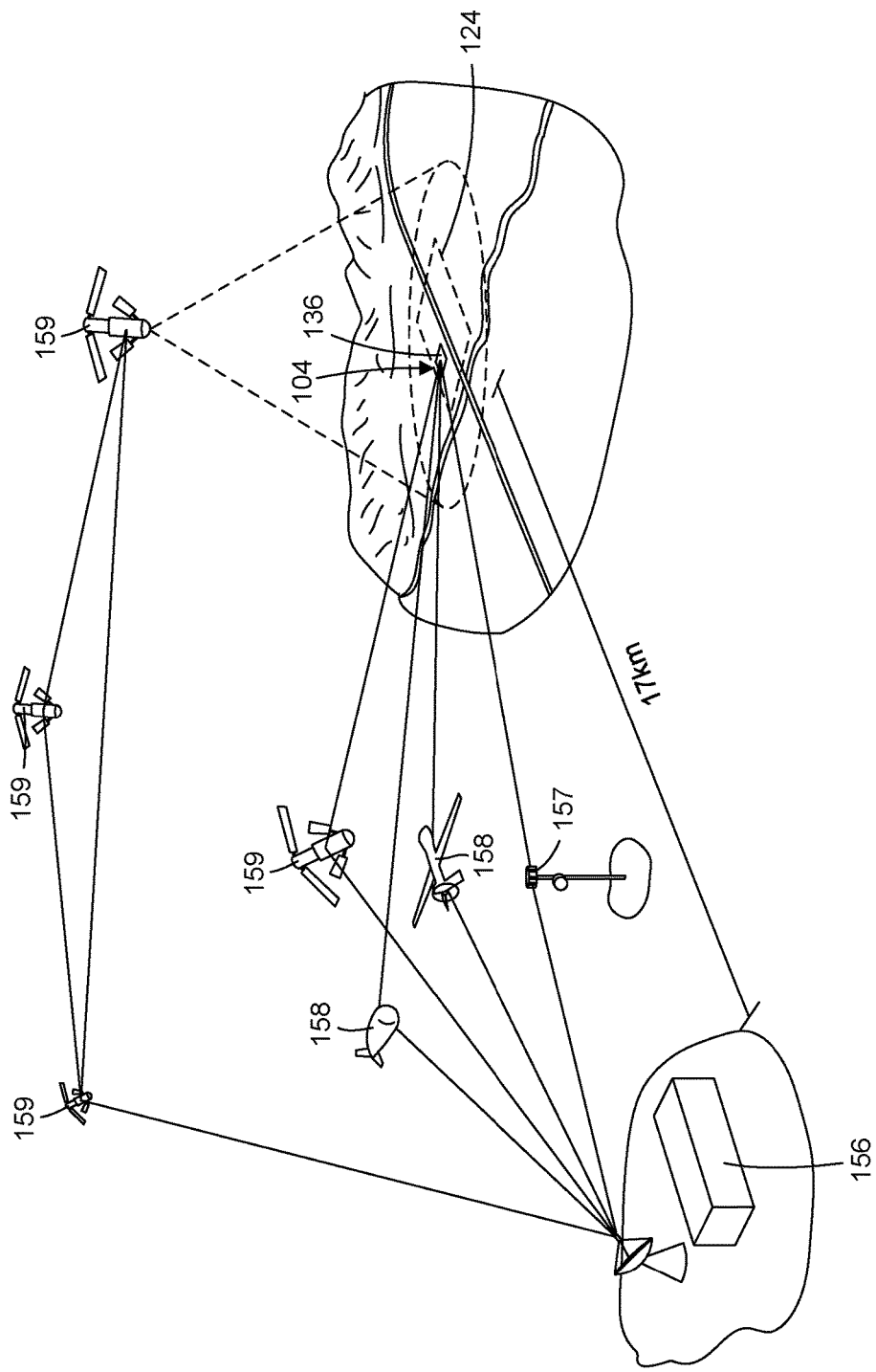
FIG. 1B depicts an operational view of an area denial system, according to one or more embodiments of the disclosure.

For example, FIG. 1B depicts an operational view of an area denial system 104 including a command and control unit 156 or operating station that is located remote to an obstacle field 124 or barrier field and networked via one or more relays. Depicted in FIG. 1B, relays can include ground relays 157, such as ground based antennae, airborne relays 158, such as airborne drones or other aircraft, or various space based relays 159, such as low earth orbit communication satellites, to relay communications back and forth between the command and control unit 156 and the obstacle field 124.

FIG. 1B depicts the command and control unit 156 as located approximately seventeen kilometers (km) from the obstacle field 124 and networked with a network gateway 136. As described, the obstacle field includes one or more sensor devices and a plurality of scatterable munitions which, in FIG. 1B, have been deployed via an aircraft into the geographic region.

Referring again to FIGS. 1A and 1B, the command and control unit 156 is configured for human operation of the area denial system 104. For example, the command and control unit 156 is operable by one or more human operators to arm/activate munitions 120 to engage targets that have entered the obstacle field 124. Put more specifically, the command and control unit 156 is configured for "human in the loop" operation of the munitions 120 where the human operators of the command and control unit 156 are the only person(s) able to authorize the munitions 120 to engage with enemy targets. For example, in some embodiments, the command and control unit 156 is operated by human operators including a primary operator. A user interface may include active screens displaying real-time sensor data, system status, and other information to the human operators. More simplistic displays may be utilized. The command and control unit 156 can be configured to receive commands for the munitions 120 solely from the primary operator, who possesses the authentication credentials required to arm and fire the munitions 120.

In one or more embodiments, the command and control unit 156 is configured to process and/or relay data from the one or more sensor devices 128, gateway devices 136, and the plurality of munitions 120 to the one or more human operators. For example, in some embodiments, the command and control unit 156 will receive data from the sensor devices 128 and the plurality of munitions 120, such as target information, munition status, and other information and relays that information to the one or more human operators. In some embodiments, the command and control unit 156 is operated by human operators including a situation awareness (SA) operator. The command and control unit 156 can be configured to display the various information to the SA operator to assist the human operators in selecting munitions to authorize, for example the information illustrated in FIGS. 1A, and 4-9.

Figure 3:
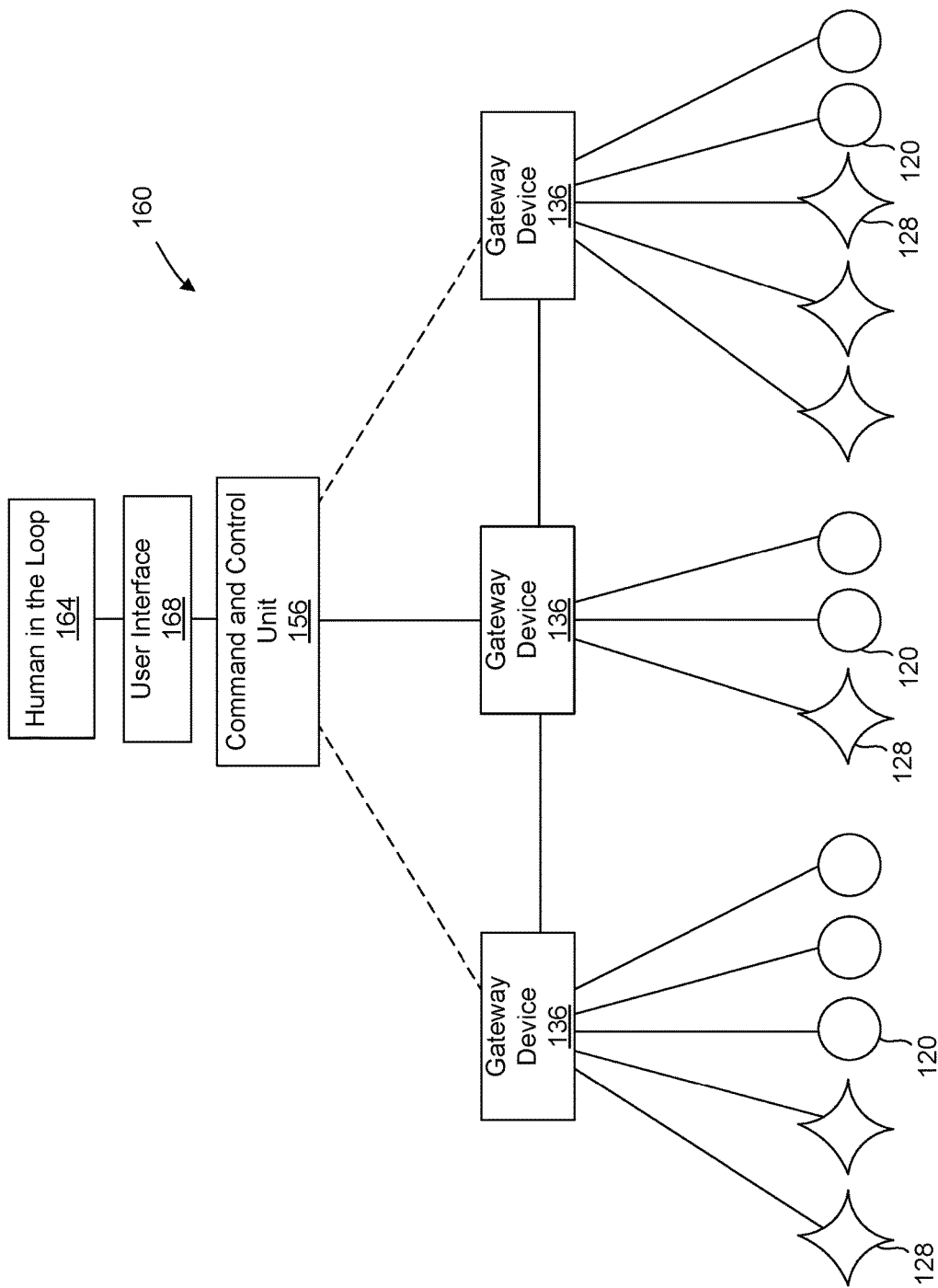
FIG. 3 a diagram of an area denial network, according to one or more embodiments of the disclosure.

FIG. 3 depicts a network diagram 160 of the area denial system 104, as depicted in FIGS. 1A, 1B, 2, 4-7, and 9, according to one or more embodiments of the disclosure. As described above, the network diagram 160 depicts the plurality of munitions 120 and sensors 128 networked together via gateway devices 136. Each of the gateway devices 136 are networked together to form a complete network including each of the sensors 128 and each of the munitions 120.

Similarly, as described above, in various embodiments the one or more of the gateway devices 136 are connected to the command and control unit 156. The command and control unit 156 is configured to receive and relay data from the munitions 120 and/or the sensors 128 to a human operator or human in the loop 164 via a user interface 168. As described further herein, with reference to FIGS. 4-10, the human in the loop 164 can issue authorization commands to one or more of the plurality of munitions 120. That data is transferred from the command and control unit 156 to the munitions 120 which, after receiving the authorization commands, activate to engage enemy targets.

Figure 4:
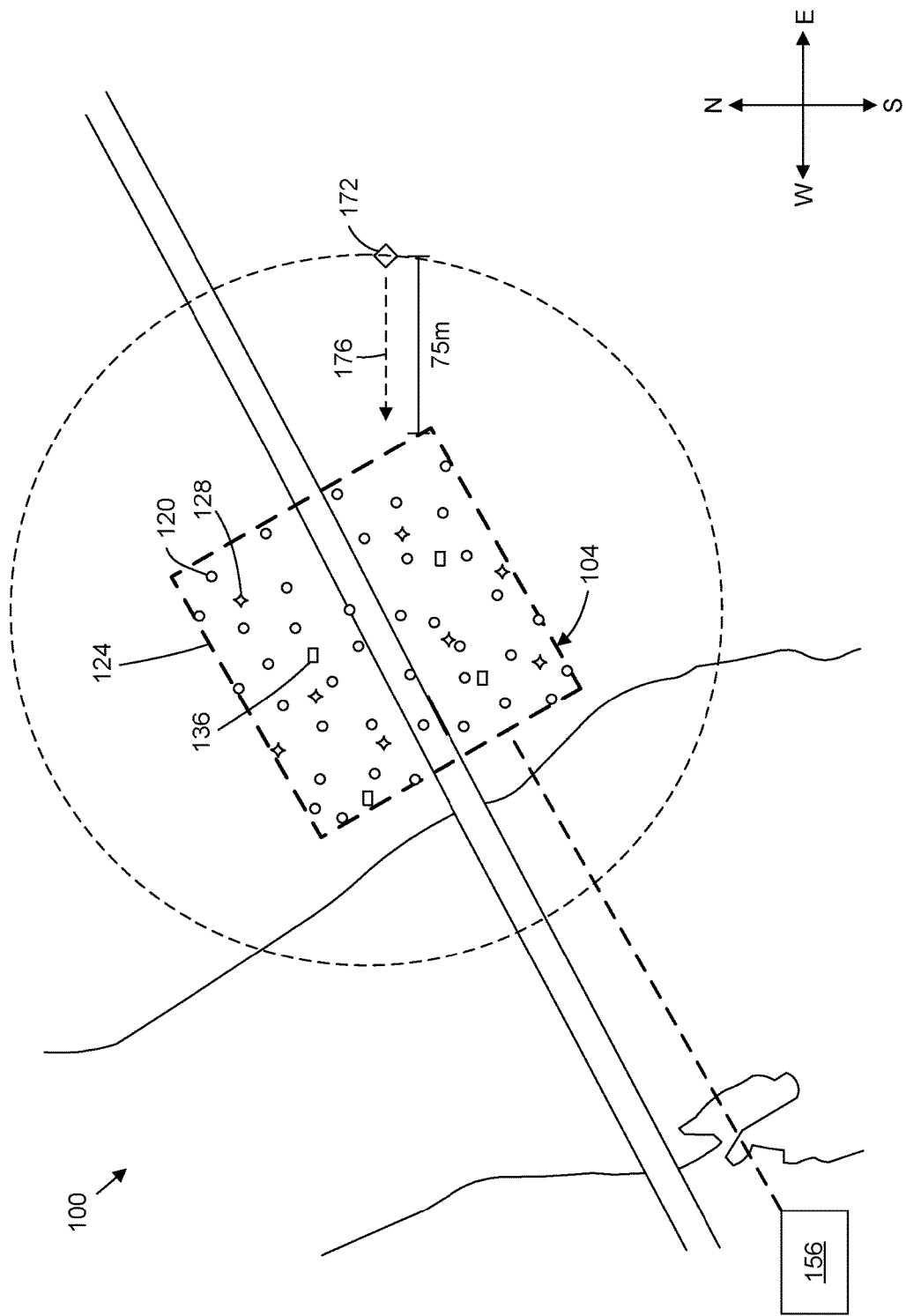
FIGS. 4-7 depict a top down view of an area denial system deployed in a geographic region, according to one or more embodiments of the disclosure.

FIG. 4 depicts the area denial system 104 upon detection of a target 172. At some point after the system is deployed 104 a potential target 172 approaches the obstacle field 124. Upon entry into the range of sensor devices 128, the sensor devices 128 detect the potential target 172. As depicted in FIG. 1A, the target is sensed 75 meters from the edge of the obstacle field 124 at the edge of range of sensor devices 128. In various embodiments, sensor devices 128 determine the position of the target 128. In some embodiments, the sensor devices 128 determine a velocity of the target 128. In various embodiments, target velocity includes the movement speed of the target 172 along with a heading or direction. As such, the sensor devices 128 determine the target's position, but additionally determine where the target is moving and at what rate. As depicted in FIG. 4, target has a heading of due west indicated by arrow 176 and a velocity of 3 meters per second.

As described, in one or more embodiments, the sensor devices 128 transmits this data to the command and control unit 156 via the gateway devices 136. As such, in various embodiments this data is presented to the one or more human operators of the command and control unit 156 to alert them to the presence of the target 172. In certain embodiments, the sensor data may be supplemented with other information from any available data source such as the munitions 120 or other sources.

Figure 5:
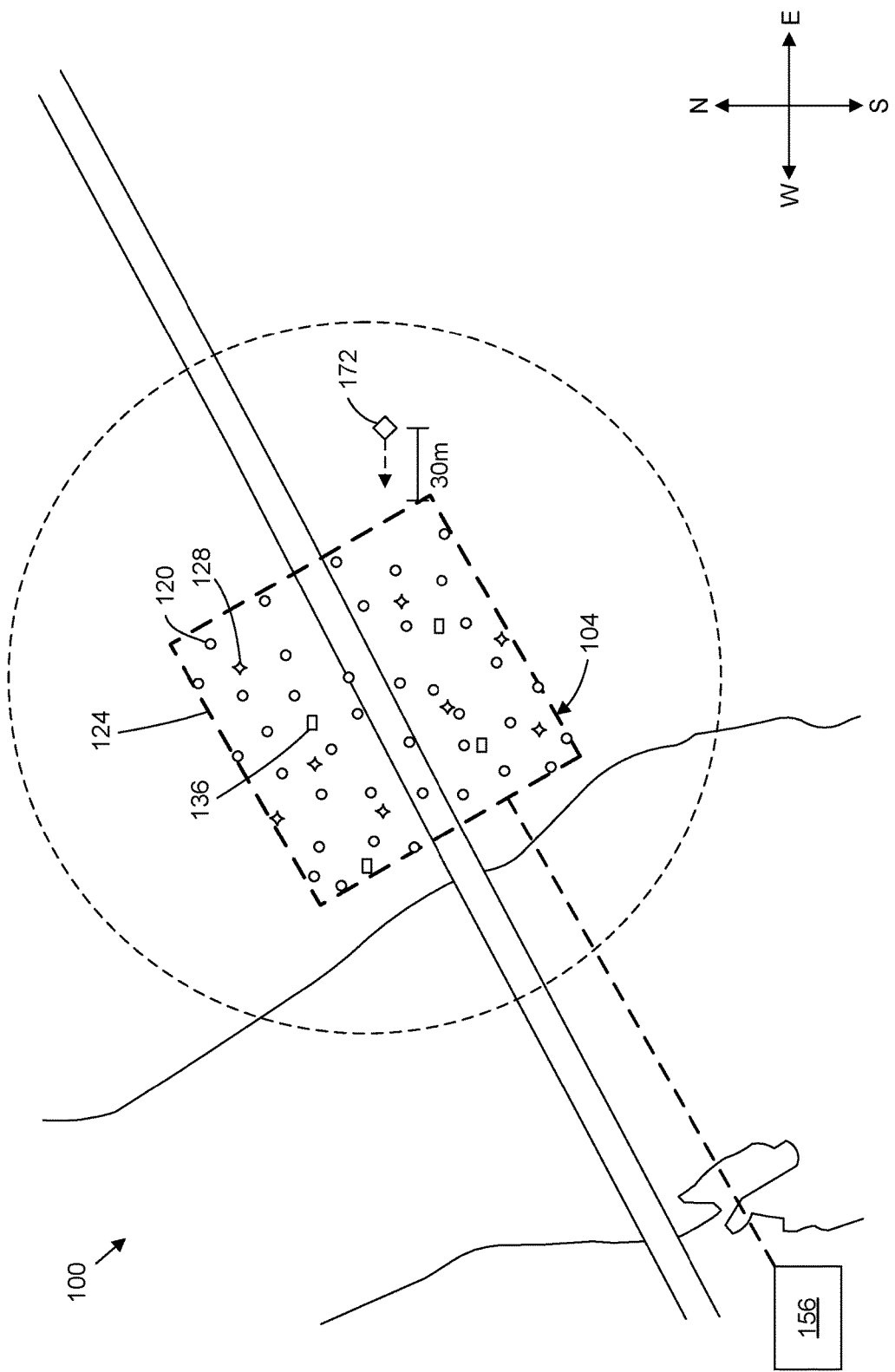

In FIG. 5, several moments have passed since initial detection of the target depicted in FIG. 4. As a result, the target 172 has moved 45 meters westward and is positioned 30 meters from the edge of the obstacle field 124. In various embodiments, while the target 172 is in range of sensor devices 128 the sensor devices 128 continually maintain a track on the position and, in some embodiments, the velocity of the target 172, to provide an up-to-date target status to the command and control unit 156 and the one or more human operators.

Figure 6:
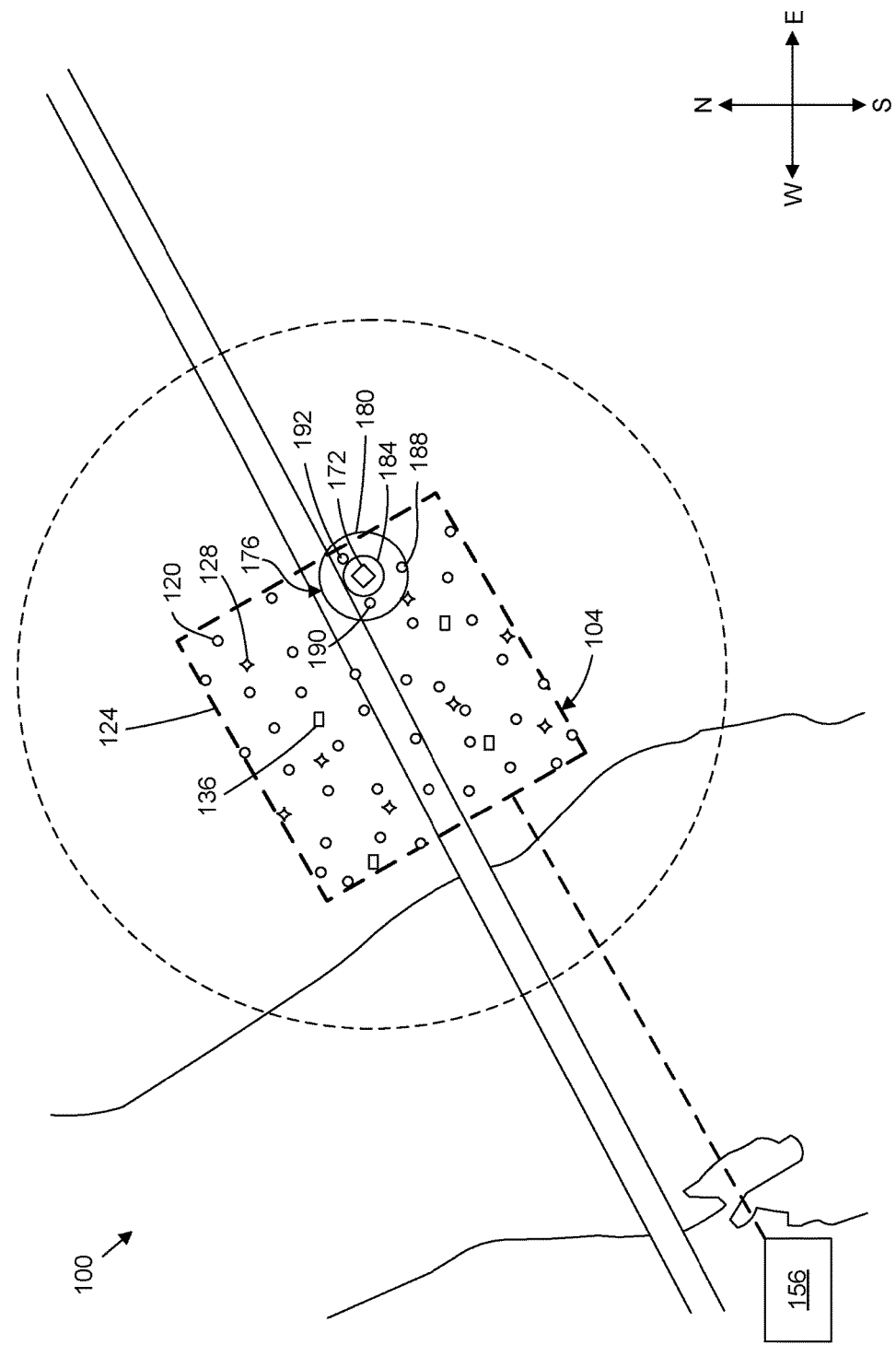

In FIG. 6, several additional moments have passed since the target was positioned 30 meters from the obstacle field 124 as depicted in FIG. 5. The target 172 has continued to move westward and has now entered the obstacle field 124. As described above, in various embodiments, the sensor devices 128 have continued to track the target 172 by determining the target position, velocity, and other sensor data, and have transmitted this sensor data to the command and control unit 156 for display to the one or more human operators.

In one or more embodiments, the target position is determined as the position of the target 172 relative to the geographic area 100. In certain embodiments the target position is determined as the position of the target 172 relative to the obstacle field 124. In some embodiments, determining the position of the target 172 relative to the obstacle field includes the position of the target 172 relative to one or more individual munitions of the plurality of munitions 120. For example, in certain embodiments, the sensor devices 128 could determine the position of the target 172 as the distance of the target 172 from one or more of the munitions 120.

In addition, FIG. 6 depicts a predicted position area 176 for the target 172. In one or more embodiments, the predicted position area 176, is depicted as circles 180, 184, which indicate the uncertainty in the position of the target 172. Put another way, in various embodiments the predicted position area 176 represents ranges of possible locations for the target 172 in the geographic region 100.

Accordingly, in one or more embodiments, the size of circles 180 and 184 is based on the uncertainty of the position of the target 172. In one or more embodiments, the uncertainty of the target position is based on various factors including, but not limited to the target position, target velocity, a sensor confidence level, the type of target (e.g. enemy personnel or enemy vehicles) and a command and control latency for communications between the command and control unit 156 and the remainder of the area denial system 104.

As used herein, the term confidence level refers to a statistical determination of a confidence interval for the sensor data that is computed from observed data. As such, the confidence level is the frequency or the proportion of possible confidence intervals that contain the true value of their corresponding parameter. In various embodiments, the sensor confidence level is defined by the sensor's ability to maintain a continuous track on the target 172. For example, in certain embodiments losing track of the target 172 momentarily would reduce the target confidence level as the amount of observed data on the target 172 would be decreased. In some embodiments, tracking the target 172 among multiple targets appearing in close proximity would reduce the target confidence level. As a result of reduced sensor confidence level, in various embodiments the size of the predicted position area 176 would increase to reflect the increased uncertainty in the position of the target 172.

The command and control latency is the time it takes for data, data packets, or other forms of communication to be received by the command and control unit 156 from the munitions 120, sensor devices 128, or gateway devices 136. In one or more embodiments, the command and control unit 156 continually determines the command and control latency of communications in the system 104 for determining the predicted position area 176. For example, in some embodiments, the command and control unit 156 is configured to constantly monitor message latencies between the command and control unit 156 and the munitions 120 and sensor devices 128. As a result, in certain embodiments the command and control unit 156 will know with a high degree of confidence how much time it takes messages to travel to and from the obstacle field 124 to the command and control unit 156. In various embodiments, the latency will vary depending on the type of connection between the command and control unit and the one or more gateway devices and/or the distance between the command and control unit and the one or more gateway devices. For example, in one or more embodiments, the command and control latency is substantially in the range of 0.2 seconds to 5 seconds.

In various embodiments, the smaller circle 184 illustrates the uncertainty in the location of the target 172 indicated by sensor data when the sensor data is received by the command and control unit 156. This position has some level of uncertainty due to the sensor confidence level, as described above, along with the velocity of the target 172, and the command and control latency. For example, with a command and control latency of two seconds, after the sensor devices 128 determine the target position and velocity, this data is received at the command and control unit 156 two seconds delayed (one way data latency) from when the actual measurements were made. In one or more embodiments this latency will determine the size of the circle 184, as more time passes from when the measurement results in a corresponding larger area of possible locations of the target 172. In certain embodiments, the velocity of the target additionally determines the size of the circle 184, for example, the greater the velocity of the target result in a larger area of possible locations of the target 172 as the target can cover a larger amount of ground in a shorter amount of time.

Similarly, the larger circle 180 illustrates the uncertainty in the target position for when commands from the command and control unit 156 arrive at the obstacle field 124 subsequent to receiving the target position (two way latency). This circle 180 has a larger area as compared to circle 184, because even more time has passed from the initial collection of sensor data indicating the target position shown in FIG. 6. As a result, circle 180 is larger to reflect the increased uncertainty in the target's position.

In various embodiments, the command and control unit 156 is configured to display the predicted location area 176 to the one or more human operators. The human operators, in various embodiments, can select munitions 120 in the obstacle field based on the predicted location of the target 172. For example, depicted in FIG. 6, munitions 188, 190, and 192 are each within the predicted location area 176. As a result the human operator could transmit authorization messages to each of these munitions to engage the target 172. Because the circle 180 indicates the possible positions of the target when accounting for two way latency encompasses these munitions 188, 190, 192, the human operator could be reasonably certain that by the time authorization messages are received that the target 172 will be successfully engaged by at least one of the munitions 188, 190, 192.

In certain embodiments, the command and control unit 156 is configured to generate recommendations to the one or more human operators for which munitions 120 should receive authorization to fire for effective engagement with the target 172. For example, as depicted in FIG. 6, because munitions 188, 190, and 192 are positioned within the predicted location area 176, the command and control unit 156 could highlight munitions 188, 190, and 192 as recommended munitions.

In various embodiments, the command and control unit 156 could additionally be configured to recommend munitions based on the effective engagement range of the munitions 120. As used herein, an engagement range for the munitions is a threshold range where the threshold indicates an outer range or distance from the munition 120 that can be affected by the ordnance of the munition. For example, in various embodiments each of the munitions 120 have an engagement range for combating the target 172, described further below with reference to FIG. 7. As such, in various embodiments the command and control unit 156 could recommend munitions based on the engagement range/position of the munition 120 where their engagement range overlaps with the predicted position area.

In certain embodiments various munitions 120 will possess different engagement ranges than other munitions, for example based on the type ordnance or design of munition 120. As such, in various the command and control unit 156 can take the various munition ranges, types, or other information into account when recommending munitions to the human operators.

In one or embodiments, various munitions 120 will possess different designs or otherwise be configured to engage specific types of targets. For example, certain munitions 120 may be configured as anti-vehicle munitions, certain munitions 120 may be configured as anti-tank munitions, and certain munitions may be configured as anti-personnel munitions. In one or more embodiments the command and control unit 156 can take various munition designs or configurations into account based when recommending munitions to the human operators.

While the command and control unit 156 is configured to provide recommendations to the human operators, it should be noted that the human operators retain sole control of whether the munitions actually receive an authorization message. Put more specifically, nothing in the area denial system 104 has the capability to autonomously generate authorization messages to the munitions 120. It should additionally be noted that the munition recommendations are not generating an autonomous response to the target 172. Instead, the command and control unit 156 is simply making a recommendation to the human operator in order to reduce the burden of munition selection. The human operator is required to authorize the recommendation in order for authorization messages to be sent. In addition, the human operator of the command and control unit 156 can alter or completely reject the recommendation if found unacceptable. As a result of this, the area denial system 104 maintains its configuration as "a human in the loop" system.

Figure 7:
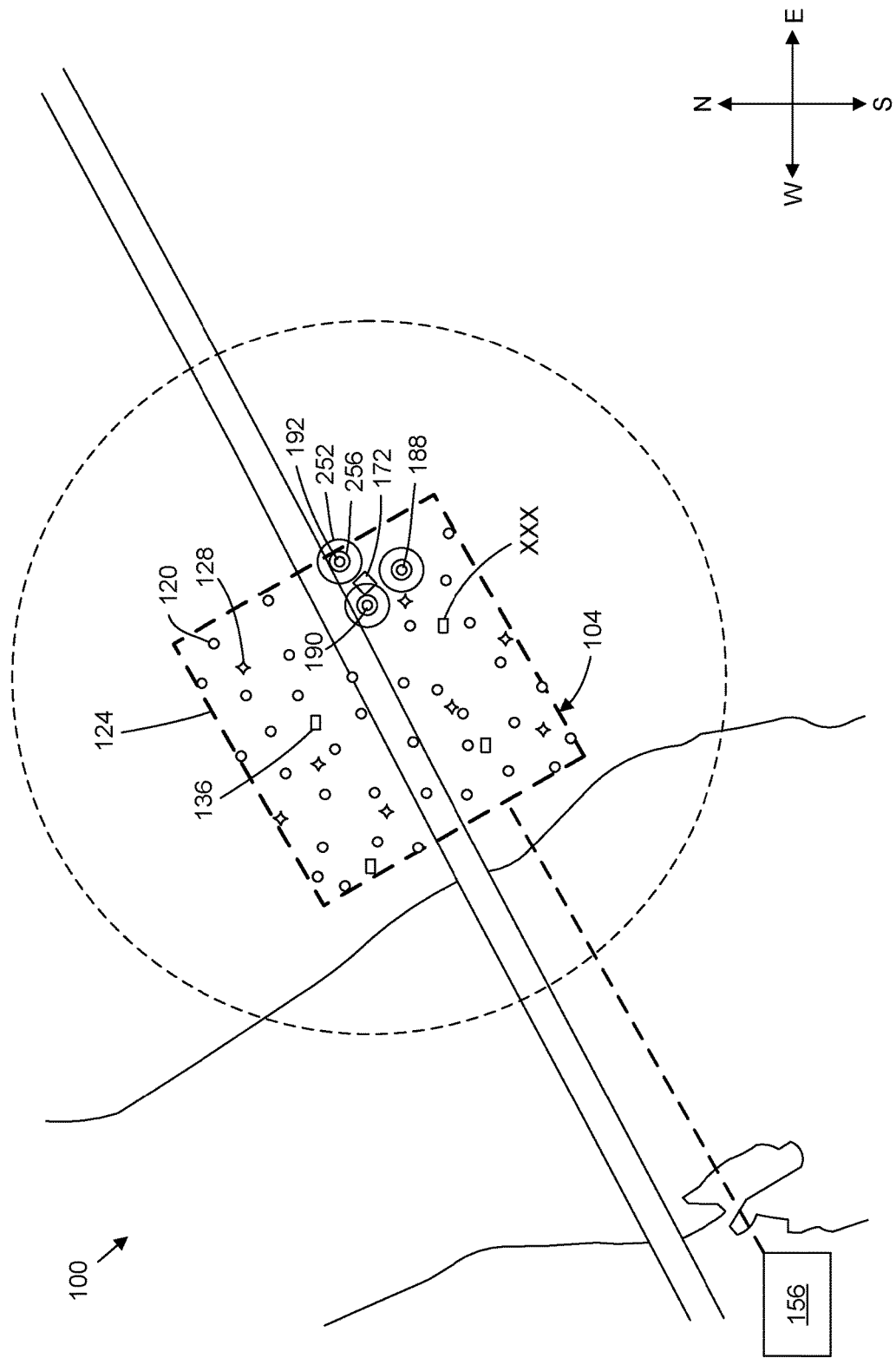

FIG. 7 depicts the area denial system 104, according to one or more embodiments. In FIG. 7, one or more human operators have received a command and control unit 156 recommendation to authorize firing of munitions 188, 190, and 192, as described above. In response, the one or more human operators have approved the recommendation, and in the response, the command and control unit 156 begins to transmit an authorization message to munitions 188, 190, and 192 to engage the target 172.

In one or more embodiments, the command and control unit 156 is configured to generate an authorization filter for transmission along with the munition authorization messages. In various embodiments, the authorization filter is a message filter used by the area denial system 104 to determine which authorization message or messages are transmitted through the area denial network from the command and control unit 156 to the munitions 120. Put another way, the authorization filter is an algorithm or a set of rules/conditions that are transmitted with the authorization message or messages that determine whether the authorization message is either transmitted to its intended munition or whether the authorization message or discarded prior to being received by the intended munition for failing to satisfy one or more of the rules/conditions. As such, in various embodiments the authorization filter is used to preserve munitions 120 in the obstacle field 124 to minimize munition loss and preserve the effectiveness of the area denial system 104.

As described above, with reference to FIG. 3, when an authorization message is transmitted from the command and control unit 156 it is initially received by one or more of the gateway devices 136 which then directs the message to its intended destination in the system 104. However, in various embodiments, the authorization filter includes a set of executable instructions that when received by the gateway device 136, utilizes processing power in the one or more gateway devices 136 to processes the rules/conditions of the authorization filter to determine whether the authorization messages are forwarded to their intended destination or whether they are discarded by the one or more gateway devices 136.

In certain embodiments, the authorization filter is not generated by the command and control unit 156 but instead is stored locally in the one or more gateway devices 136. In various embodiments, when the gateway devices 136 receive authorization messages from the command and control unit 156 the gateway device is configured to access the authorization filter to determine whether the authorization message is forwarded to its intended destination or whether the messages are non-effected and withheld from transmission.

FIG. 8 depicts an authorization message filtering process in a gateway device 136, according to one or more embodiments. Depicted in FIG. 8, and additionally referring back to FIG. 7, a command and control unit 156 has transmitted a command and control message 204 to a gateway device 136 including three authorization messages 196, 198, 200 corresponding to munitions 188, 190, and 192. In addition, command and control message 204 includes an authorization filter 208.

As described above, the authorization filter 208 includes a set of instructions or an algorithm which, when received at the gateway device 136, utilizes local processing power in the gateway device 136 to go through a set of rules/conditions in the authorization filter 208 that determine which of the three authorization messages 212, 216, 220 should be transmitted to munitions 188, 190, 192.

For example, in some embodiments, the authorization filter 208 includes a set of munition rules 224, 228, 232 that receive and review target sensor data 236 from one or more sensor devices 128 to determine the position of target 172. Because the authorization filter 208 utilizes processing power in the gateway device 132 to review sensor data 236, the authorization filter 208 will have access to relatively real-time, latency free data due to the close proximity of the gateway device 132 and the one or more sensor devices 128 as compared to the distance of the command and control unit 156. As such, the position of the target 172 that is determined by the gateway device 132 will generally be more accurate as compared to the predicted target location or, in some instances, an exact determination of the target's position. In one or more embodiments, latency between the sensor devices 128 and the gateway devices is in the range of 5 to 100 milliseconds. In some embodiments, the gateway device 132 can also determine a second predicted position area for the target at least based on the reduced communication latency.

Figure 8A:
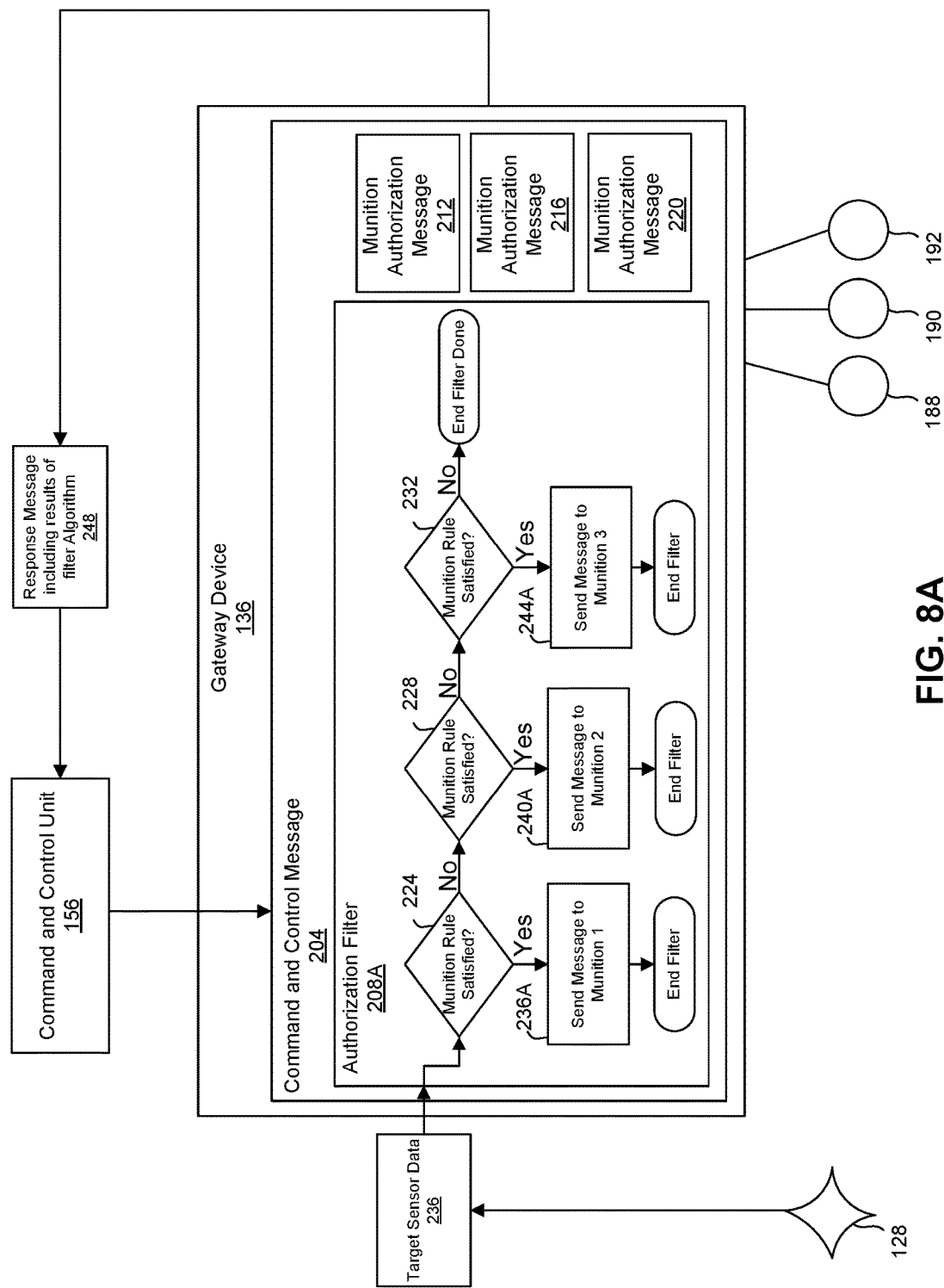
FIGS. 8A and 8B depict flowchart diagrams of authorization filters for latency compensation in an area denial system, according to one or more embodiments of the disclosure.
Figure 8B:
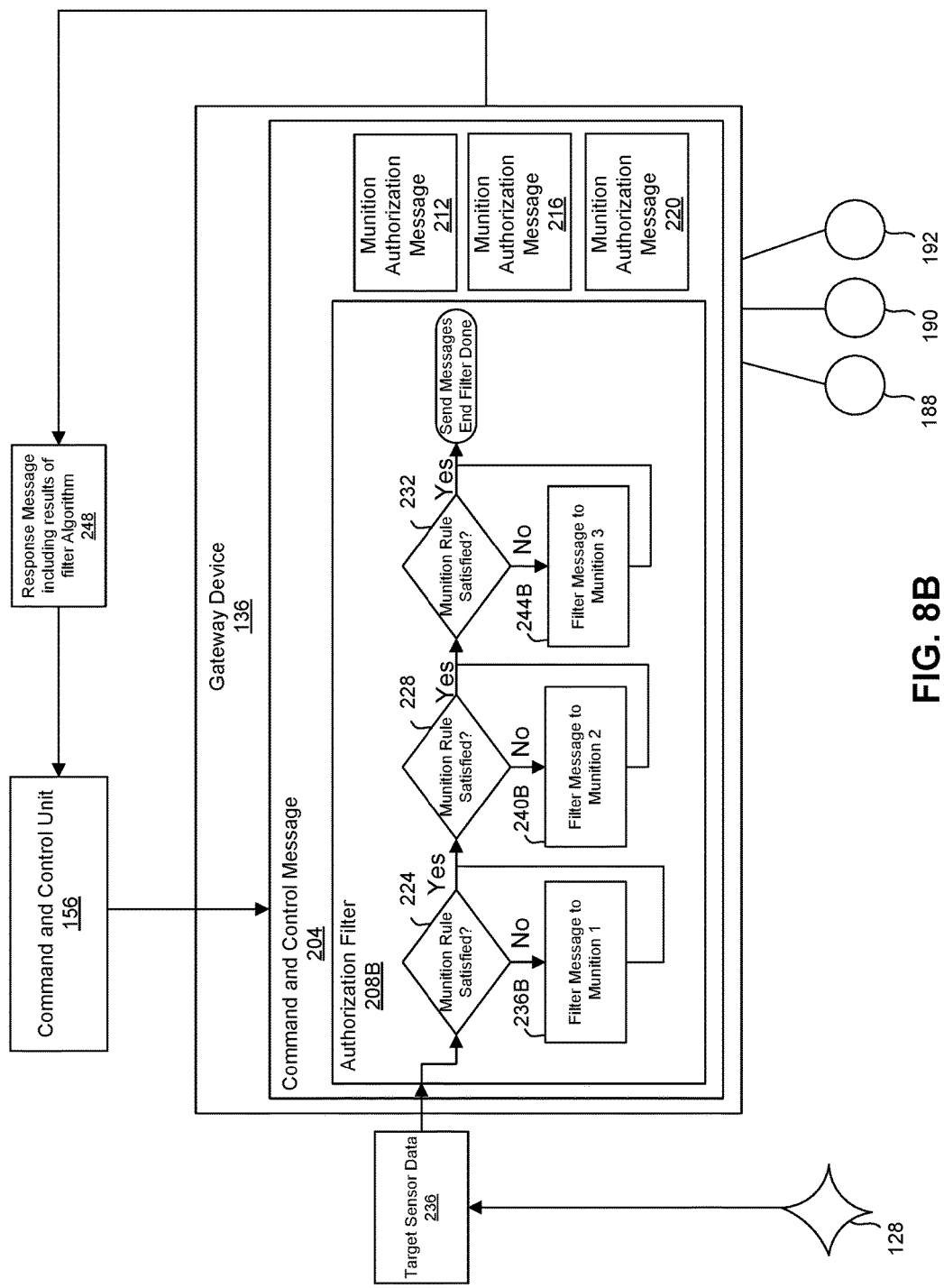

An example set of rules/conditions for the authorization filter are depicted in FIGS. 8A and 8B, depicting authorization filters 208A and 208B, respectively.

Referring to FIG. 8A, the example authorization filter 208A includes the three munition rules 224, 228, 232. In various embodiments, the authorization filter 208A progresses sequentially through each munition rule 224, 228, 232 to determine whether one or more of the munition rules 224, 228, 232 have been satisfied. As depicted in FIG. 8A, if one of the munition rules is satisfied, the authorization filter 208 then progresses to one of operation blocks 236A, 240A, 244A to transmit one of the authorization messages 212, 216, 220 to one of the munitions 188, 190, 192.

In one or more embodiments, the authorization filter 208A then terminates once one of the authorization message 212, 216, 220 has been transmitted. In certain embodiments, if none of the munition rules are satisfied, then the authorization filter 208A terminates without transmitting any of the authorization messages 212, 216, 220.

In either case, in one or more embodiments, the authorization filter 208A and the gateway device 136 are configured to transmit a response message 248 to the command and control unit 156 that indicates the status of the munitions 188, 190, 192 and whether the authorization messages 212, 216, 220 were transmitted.

In this example, the authorization filter 208A proceeds to test various rules in sequence with regard to munitions 188, 190, and 192. Also, in this example, the filter 208A simply stops and transmits a single authorization message once one of the filter rules 224, 228, 232 is satisfied.

Referring to FIG. 8B, the example authorization filter 208B includes the three munition rules 224, 228, 232. In various embodiments, the authorization filter 208B progresses sequentially through each munition rule 224, 228, 232 to determine whether one or more of the munition rules 224, 228, 232 have been satisfied. If one of the munition rules are not satisfied, then the authorization filter 208B progresses to one of operation blocks 236B, 240B, 244B where the filter 208B blocks or filters one or more of the received authorization messages 212, 216, 220 from being transmitted to munitions 188, 190, 192.

In one or more embodiments, the authorization filter 208B then continues to proceed to the next munition rule 224, 228, 232 and the process repeats until each munition rule has been evaluated or tested. In various embodiments, once each munition rule has been tested, the authorization filter proceeds to transmit each of the authorization message 212, 216, 220 that have not been filtered by one or more of operation blocks 236B, 240B, 244B. In certain embodiments, if each of the munition rules are satisfied, then the authorization filter simply transmits each of the authorization messages 212, 216, 220.

In either case, in one or more embodiments, the authorization filter 208B and the gateway device 136 are configured to transmit a response message 248 to the command and control unit 156 that indicates the status of the munitions 188, 190, 192 and whether the authorization messages 212, 216, 220 were transmitted.

It should be noted that, in one or more embodiments, the system 104 can utilize various kinds of authorization filters that may have widely varying types or methods of processing rules/conditions to govern the transmission of authorization messages. For example, in one or more embodiments, the authorization filter 208 could determine rules/conditions simultaneously, transmit multiple of the authorization messages 212, 216, 220, or have various other designs for the authorization filter 208 depending on the preference of the user.

In various embodiments, authorization rules 224, 228, 232 can include various criteria for determining whether to transmit the authorization messages 212, 216, 220. For example, in one or more embodiments, the authorization rules 224, 228, 232 could include determining whether the target position is within some threshold distance from a munition, whether the target position is presently outside an authorized engagement area, determining whether that target identify is changed, whether the sensor data confidence level has dropped below a preset threshold, or whether a probability of successful engagement with the target has dropped outside of a threshold. In addition, there could be even other factors that result in the authorization filter 208 dropping all authorized messages.

For example, in one or more embodiments, the munition rules 224, 228, 232 each determine whether the target sensor data 236 indicates that the target is positioned within a threshold distance of an engagement range for each of the munitions 188, 190, 192. As such, in various embodiments, the authorization filter 208 would initially determine whether sensor data 236 indicates that the target 172 was within an engagement range of munition 188. If the sensor data 236 satisfies the first munition rule 224 then the authorization filter 208 would then transmit the first munition authorization message 212 to munition 188. If not, the authorization filter 228 would progress to determine whether target 172 was within a threshold distance to munition 190, if so and pass the authorization message 216 to munition 190. If not, the authorization filter 208 would then progress to determine whether 172 was within a threshold distance to munition 192. If none of the munition rules 224, 228, 232 are satisfied, the authorization filter 208 would then not deliver any of the authorization messages 212, 216, 220 and instead report back to the command and control unit 156 that the filter had no solution.

Referring again to FIG. 7, an example enemy combatant location at the time of the gateway message processing is depicted. In one or more embodiments, diameter rings 252, 256 represent potential criteria for the authorization filter. For instance, in various embodiments the smaller ring 256 represents a zone or threshold engagement distance from the munitions 188, 190, 192 indicating a 90% probability of successful engagement with the target 172. In various embodiments, the authorization filters 208A, 208B include the rules/conditions for authorization messages that the target 172 must be positioned within the smaller ring 256 with the high probability of a kill. In that instance, no message would be delivered to the munitions 188, 190, 192, as the target 172 is outside of that ring for all three munitions 188, 190, 192. However, in various embodiments ring 252 represents a zone or threshold distance from the munitions 188, 190, 192 indicating a 75% probability of successful engagement with the target 172. In various embodiments, the authorization filters 208A, 208B include the criteria for authorization messages that the target 172 be positioned within the ring 252. In that instance, an authorization message for munition 190 would be delivered while authorization messages for munitions 188 and 192 would be ignored or de-authorized. In embodiments the filter may declare that the munition be within a certain range with respect to the target, the range being sufficient to not kill the target thus presenting a warning firing.

In certain embodiments, as described above, various munitions 120 will possess different engagement ranges than other munitions, for example based on the type ordnance or design of munition 120. As such, in various the filters 208A, 208B can take the various munition ranges, types into account as part of the rules/conditions for transmitting authorization messages. Similarly, in one or embodiments, various munitions 120 will possess different designs or otherwise be configured to engage specific types of targets, such as personnel, tanks, vehicles, ships, drones, aircraft, or the like. In one or more embodiments the authorization filter 208A, 208B can take various munition designs or configurations into account as part of the rules/conditions for transmitting authorization messages.

In certain embodiments, the gateway device 136 could be accessible to receive a set of interrupt instructions that configure the gateway device 136 or the munitions 120 to discard or non-effect any authorization message from the command and control unit 156. In one or more embodiments, the interrupt instructions can be received from a third party or device/processor outside of the area denial system. In certain embodiments, this interrupt signal can be used as an emergency shut down or override of the area denial system used, for example, in the event of computer or system error, failure of the system to detect a friendly or civilian target, or in other necessary situations. The third party gateway accessibility function may be part of an authorization filter.

Figure 9:
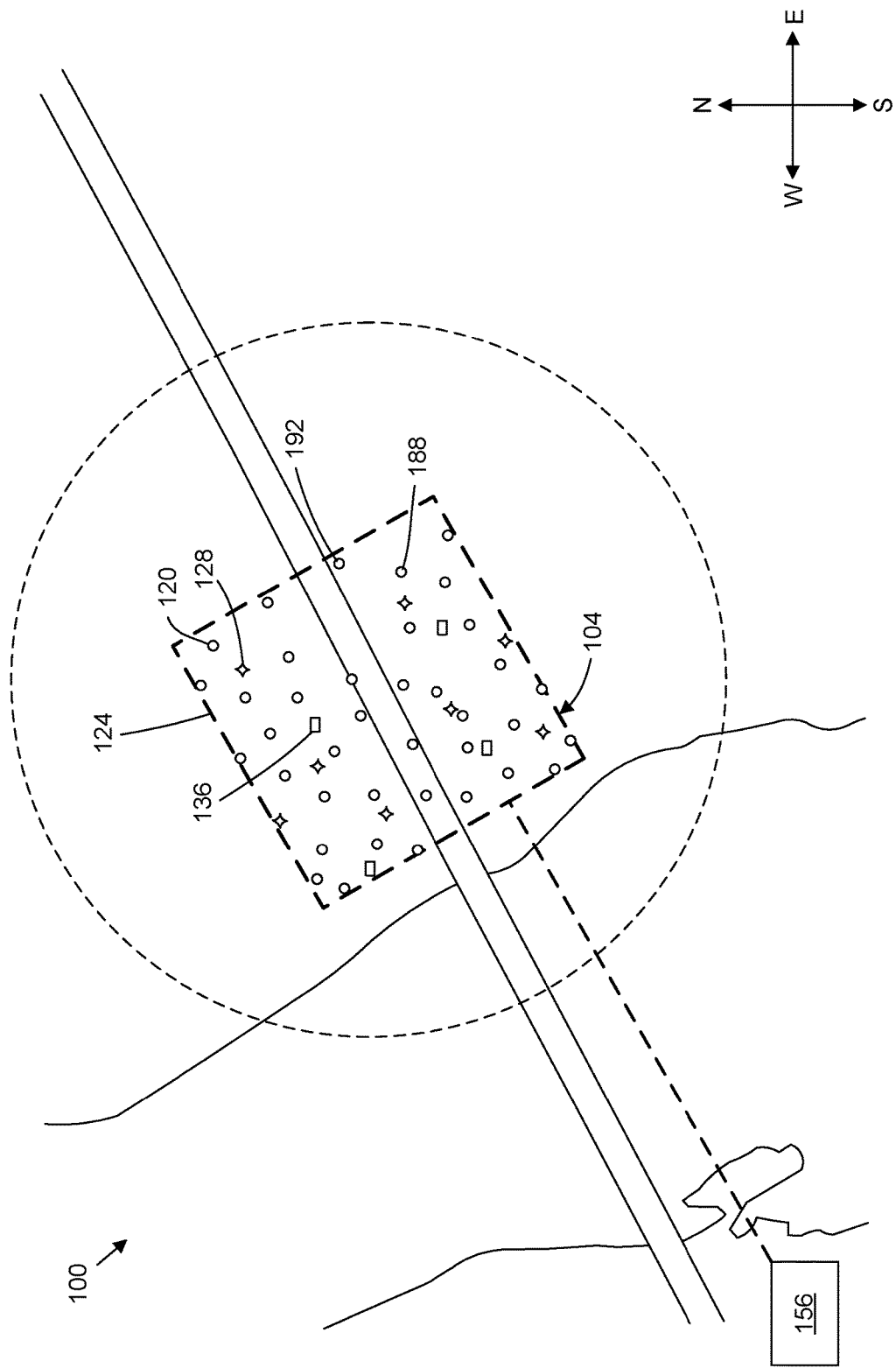
FIG. 9 depicts a top down view of an area denial system deployed in a geographic region, according to one or more embodiments of the disclosure.

FIG. 9 depicts the area denial system 104 subsequent to transmission of the authorization message to munition 180 (FIG. 7). In various embodiments, the target 172 has been successfully eliminated by the authorized munition 180 and the munition is no longer displayed. In addition, munitions 188 and 190 have been preserved for future use against additional targets.

Figure 10:
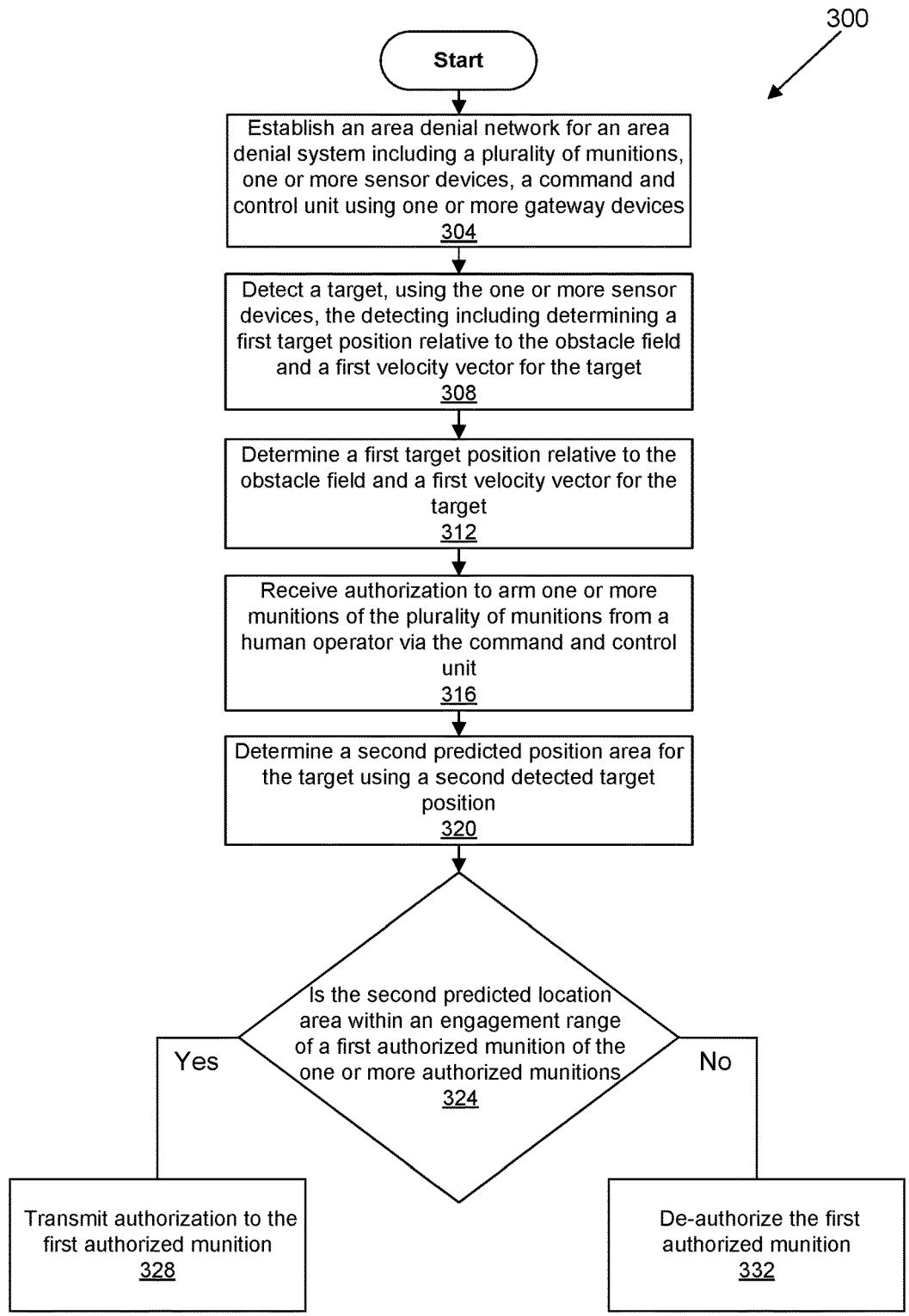
FIG. 10 depicts a flowchart diagram of a method of latency compensation in an area denial system, according to one or more embodiments of the disclosure.

FIG. 10 depicts a flowchart diagram of a method 300 for communication latency compensation in an area denial system, according to one or more embodiments. In one or more embodiments, the method 300 includes, in operation 304, establishing an area denial network for an area denial system including a plurality of munitions, one or more sensor devices, and a command and control unit using one or more gateway devices.

In one or more embodiments, the method 300 includes, in operation 308, detecting a target, using the one or more sensor devices, the detecting including determining a first target position relative to the obstacle field.

In one or more embodiments, the method 300 includes, in operation 312, determining a first target position relative to the obstacle field.

In one or more embodiments, the method 300 includes, in operation 316, receiving authorization to arm one or more munitions of the plurality of munitions from a human operator via the command and control unit.

In one or more embodiments, the method 300 includes, in operation 320, determining a second predicted position area for the target using a second detected target position.

In one or more embodiments, the method 300 includes, in decision block 324, determining whether the second predicted location area is within a threshold distance of a first authorized munition of the one or more authorized munitions. In various embodiments, the threshold distance is the engagement range of the first authorized munition for engagement with a target.

In one or more embodiments, if the second predicted location area is within the threshold distance of the first authorized munition then the method 300 includes, in operation 328, transmitting authorization to the first authorized munition.

In one or more embodiments, if the second predicted location area is outside of the threshold distance of the first authorized munition then the method 300 includes, in operation 332, de-authorizing the first authorized munition. In various embodiments, de-authorizing the munition means ignoring the authorization message at the gateway device, as described above with reference to FIGS. 7-8.

Figure 11:
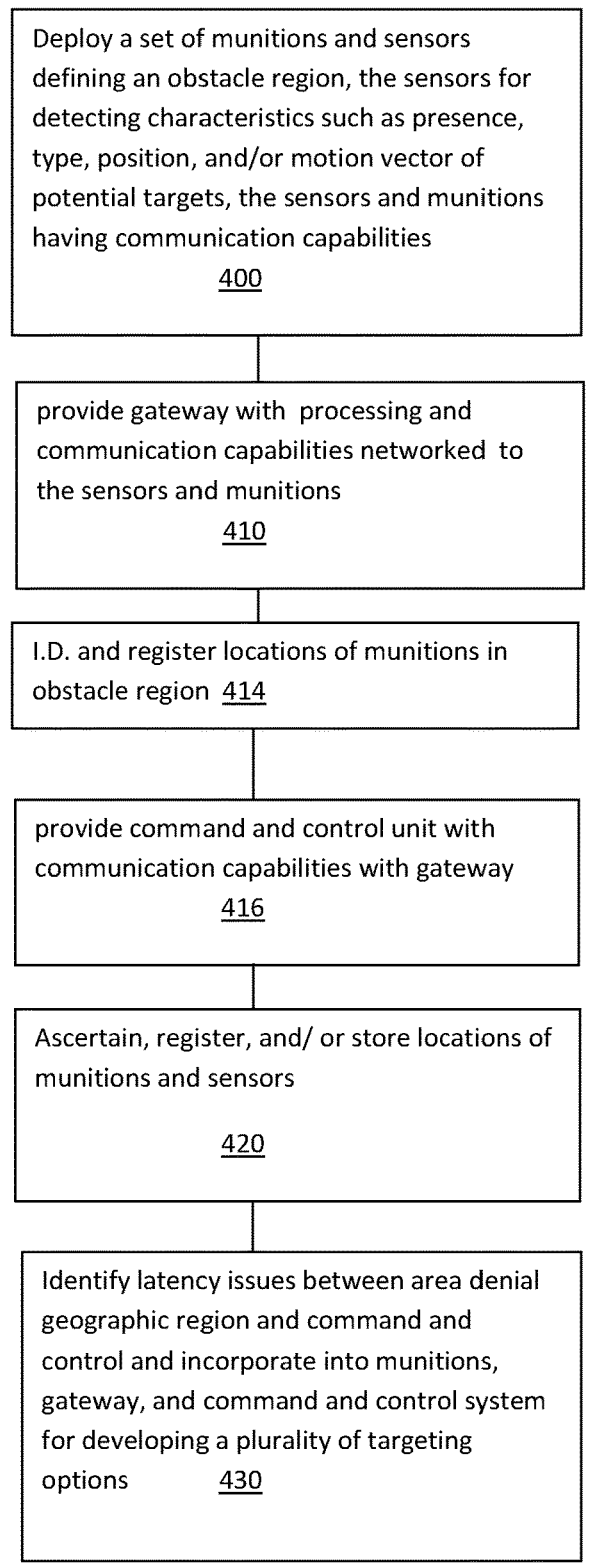
FIG. 11 depicts a flowchart diagram of a method of assembling an area denial system, according to one or more embodiments of the disclosure.

FIG. 11 represents embodiments of a method for setting up an area denial region by first deploying the munitions and sensors 400, providing one or more gateways networked to the munitions and sensors 410, the locations of the munitions are identified such as by GPS capabilities in the individual munitions, by communication triangulation by the gateways, or other location identifying means. The gateway devices provide communications with the command and control unit 416, ascertain, register, and/or store locations of the munitions and sensors 414. The registering and storing of locations may be accomplished within the processing and memory capabilities of the gateway or the command and control station or elsewhere. The ascertaining the locations may be accomplished with individual GPS capabilities of the munitions, by triangulation means, by monitoring the locations during placement of the munitions, or by other means. Additionally, the system needs to identify and the communication latencies associated with the system, particularly latencies associated with the remote command and control station and the delays in processing, transmitting data, displaying information, and human decision making. Such may be done at the gateway devices and/or the command and control unit.

Figure 12:
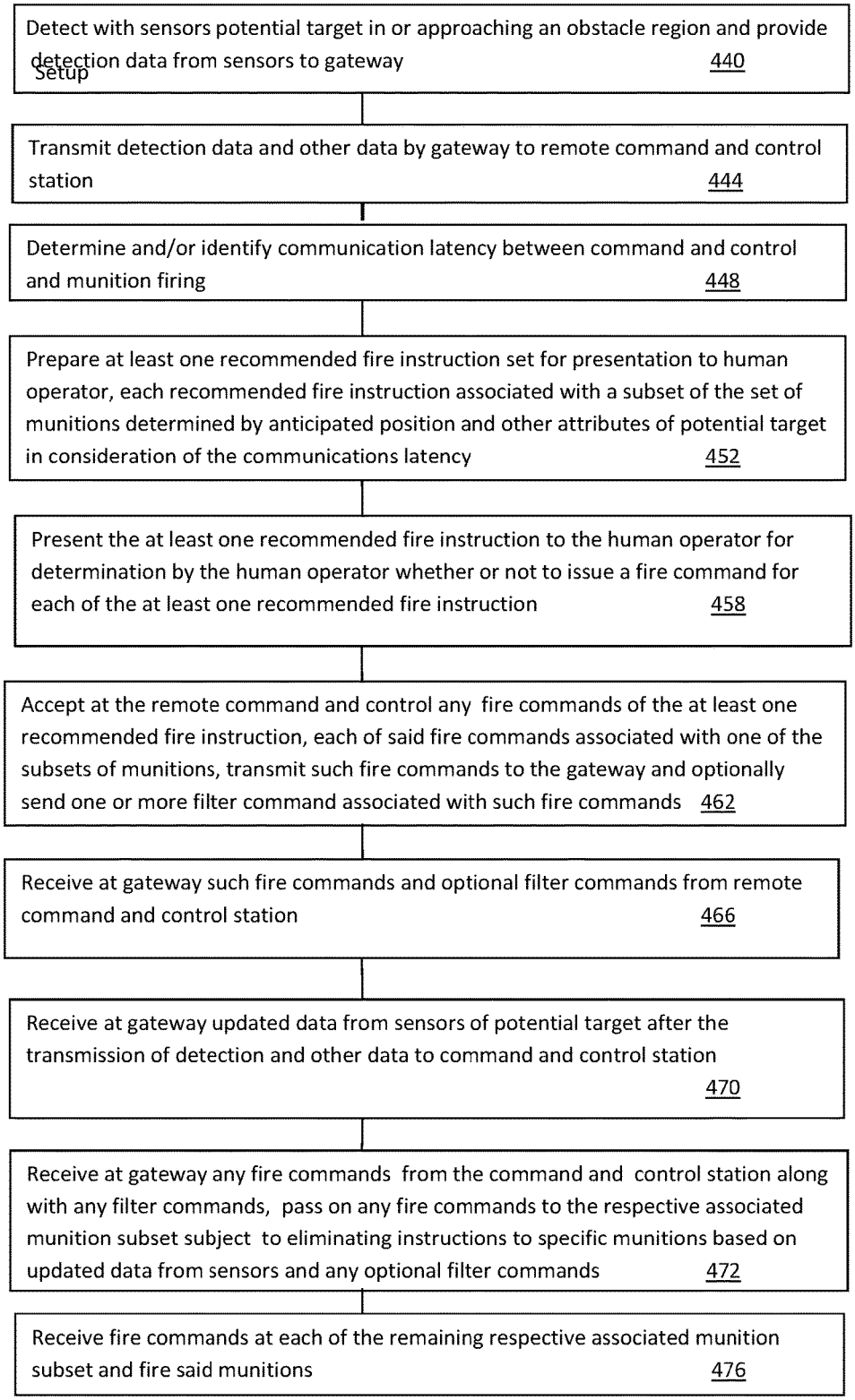
FIG. 12 depicts a flowchart diagram of a method of operating an area denial system, according to one or more embodiments of the disclosure.

Referring to FIG. 12, in embodiments, a method of operating an area denial geographic region that has been installed with a remote command and control unit is portrayed. Initially system sensors detect a potential target in or approaching the obstacle area and transmit data to the gateway 440, and then the gateway transmits to the command and control unit 444. At some point the communication latency has been determined 448 and one or more recommended or proposed fire instructions, each fire instruction associated with a particular subset of the set of munitions in the region and each fire instruction generated taking the communication latency into consideration 452. Such fire instructions also taking attributes of the potential target into consideration, such attributes may include a velocity vector or known path of the potential target, whether the target is a person or vehicle and then the type of vehicle, the certainty of whether the target is friend or foe. The fire instructions also may be formulated based on the number of targets and their individual and group attributes. The fire instructions may be presented to the human operator either discretely or in combinations 458. Where there are multiple fire instructions, the instructions may be presented serially or simultaneously to the human operator.

Where the human operator issues a fire command for one or more fire instructions, said command is communicated to the gateway 462. Additionally, the command and control, by operator control or by automation, may provide one or more filter commands, as described above, to accompany the fire command to the gateway 462.

Figure 13:
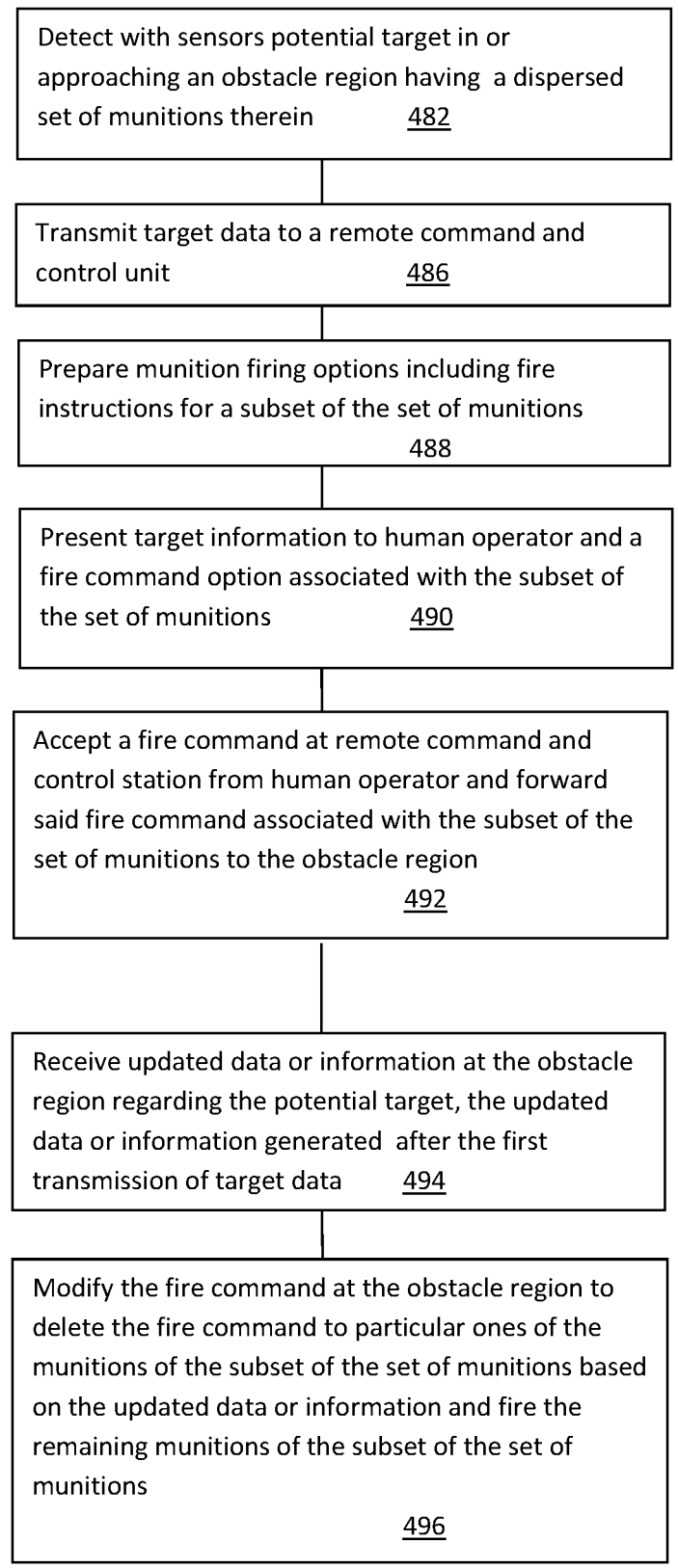
FIG. 13 depicts a flowchart diagram of a method of operating an area denial system, according to one or more embodiments of the disclosure.

Referring to FIG. 13, other embodiments provide a method of operating an area denial region comprising detecting the potential target in or approaching the obstacle field, the obstacle field having a dispersed set of munitions 482; transmitting target data from the obstacle field to the command and control unit distanced from the obstacle field 486; preparing and presenting munition firing options of a subset of the set of munitions to a human operator at the command and control unit 488, 490; accepting fire command of specific munitions from human operator at the command and control unit and transmitting said fire command associated with the subset of munitions to the obstacle field 492; receiving updated data or information regarding the potential target at the obstacle field, the updated data or information after the earlier transmitting of data 494; and at the obstacle field, modifying the fire command of the subset of the set of munitions thereby interrupting or deleting the fire command to one or more munitions at the subset of the set of munitions and firing the remaining munitions of the subset of the set of munitions at the obstacle field.

The modifying of the fire command at the obstacle field may be by a gateway device that provides processing and communications between the gateway device and munitions and communications between the gateway device and a remote command and control unit.

One or more embodiments may be a computer program product. The computer program product may include a computer readable storage medium (or media) including computer readable program instructions for causing a processor to enhance target intercept according to one or more embodiments described herein. For example, as described above with reference to FIGS. 8A and 8B, in one or more embodiments the authorization filters 208A, 208B are an element of a computer program product, included as program instructions that are embodied in a computer readable storage medium. As such, in various embodiments, the authorization filters 208A and 208B are authorization filter means for accomplishing various embodiments of the disclosure, such as described above with reference to FIGS. 5, 6, 7, 8A, and 8A.

The computer readable storage medium is a tangible device that can retain and store instructions for use by an instruction execution device. The computer readable storage medium may be, for example, an electronic storage device, a magnetic storage device, an optical storage device, or other suitable storage media.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program instructions, as described herein, can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forward the computer readable program instructions for storage in a computer readable storage medium within the respective computing/processing device.

Computer readable program instructions for carrying out one or more embodiments, as described herein, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a single computer, or partly on the single computer and partly on a remote computer. In some embodiments, the computer readable program instructions may execute entirely on the remote computer. In the latter scenario, the remote computer may be connected to the single computer through any type of network, including a local area network (LAN) or a wide area network (WAN), or public network.

One or more embodiments are described herein with reference to a flowchart illustrations and/or block diagrams of methods, systems, and computer program products for enhancing target intercept according to one or more of the embodiments described herein. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved.

In one or more embodiments, the program instructions of the computer program product are configured as an "App" or application executable on a laptop or handheld computer utilizing a general-purpose operating system. As such, in various embodiments command and control unit 156 can be a handheld device such as a tablet, smart phone, or other device.

Figure 14:
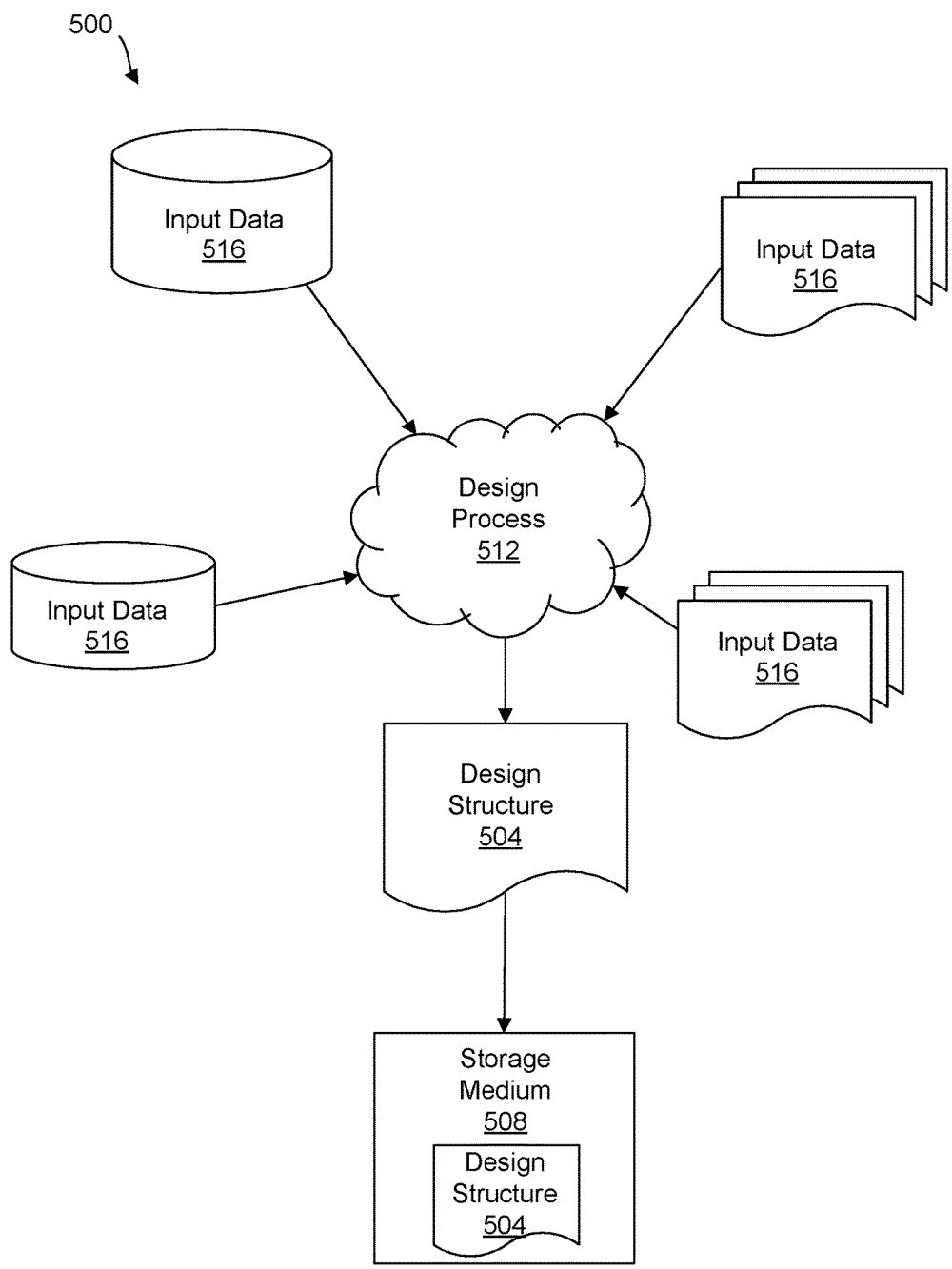
FIG. 14 depicts a flow diagram of a design process used in an operational simulation of an area denial system, according to one or more embodiments.

FIG. 14 shows a block diagram of a design flow 500 for generating a design structure 504 encoded on a computer readable storage medium 508 used for, in some embodiments, area denial simulation and testing. Design flow 500 includes processes, machines and/or mechanisms for generating design structures comprising logically or otherwise functionally equivalent encoded representations of the systems and/or devices described herein. For example, design structures may include data and/or instructions that when executed or otherwise processed on a data processing system generate a structurally, mechanically, systematically, or otherwise equivalent representation of the plurality of munitions, the sensor devices, gateway devices, and command and control unit, as described herein with reference to FIGS. 1A-13. The design structures processed and/or generated by design flow 500 may be encoded or stored on any suitable computer readable storage media 504.

Processes, machines and/or mechanisms for generating design structures may include, but are not limited to, any machine used in a projectile design process, such as designing, manufacturing, or simulating a projectile performance characteristics. For example, machines may include, computers or equipment used in projectile testing, or any machines for programming functionally equivalent representations of the design structures into any medium.

FIG. 14 illustrates a design structure 504 that may be outputted by a design process 512. Design structure 504 may be a simulation to produce a functionally, structurally, systemic, and/or logically equivalent representation of an area denial system. In one or more embodiments, whether representing functional, structural, and/or system design features, design structure 504 may be generated using electronic computer-aided design tools.

For example, in certain embodiments the design structure is a functionally equivalent representation of an area denial system including a plurality of munitions defining an obstacle field, one or more sensor devices, and a command and control unit, networked together, via one or more gateway devices, in an area denial network having a command and control latency for communication between the command and control unit and the remainder of the area denial system. In various embodiments, the design structure is encoded on a non-transitory machine-readable data storage medium. In various embodiments, the design structure includes elements that when processed in a computer-aided simulation, operates as a logically and functionally equivalent representation of an area denial system as described above with reference to FIGS. 1-12.

As such, design structure 504 may comprise files or other data structures including human and/or machine-readable source code, compiled structures, and computer executable code structures that when processed by a design or simulation data processing system, functionally simulate or otherwise represent circuits or other levels of hardware logic design.

Design process 512 may include processing a variety of input data 516 for generating design structure 504. Such data may include a set of commonly used components, and devices, including models, layouts, and performance characteristics. The input data may further include design specifications, design rules, and test data files which may include test results, and other testing information regarding components, devices, and circuits that are utilized in one or more of the embodiments of the disclosure. Once generated, design structure 504 may be encoded on a computer readable storage medium or memory, as described herein.

Figure 15A:
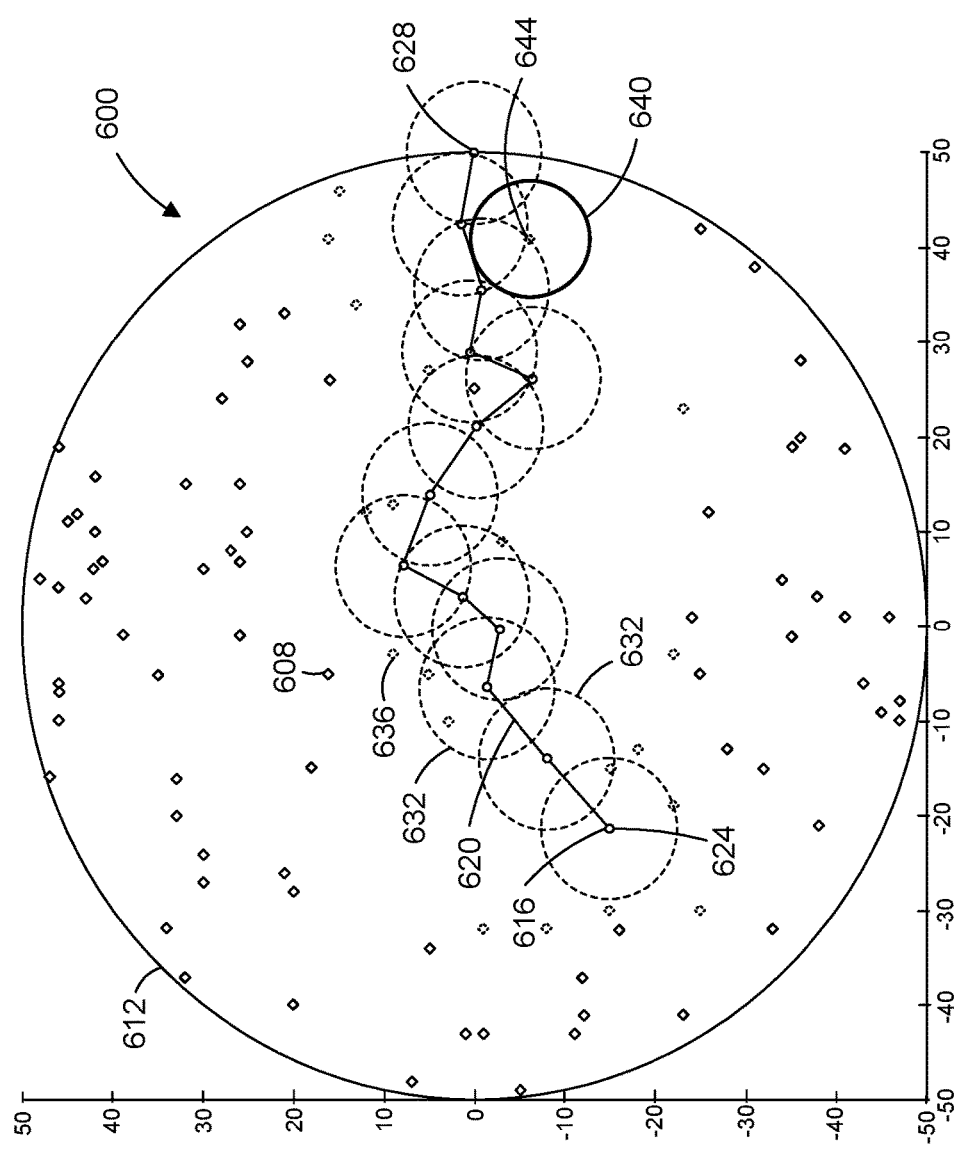
FIGS. 15A-15B depict charts showing the results design structure output of a simulation of an area denial system according to one or more embodiments.
Figure 15B:
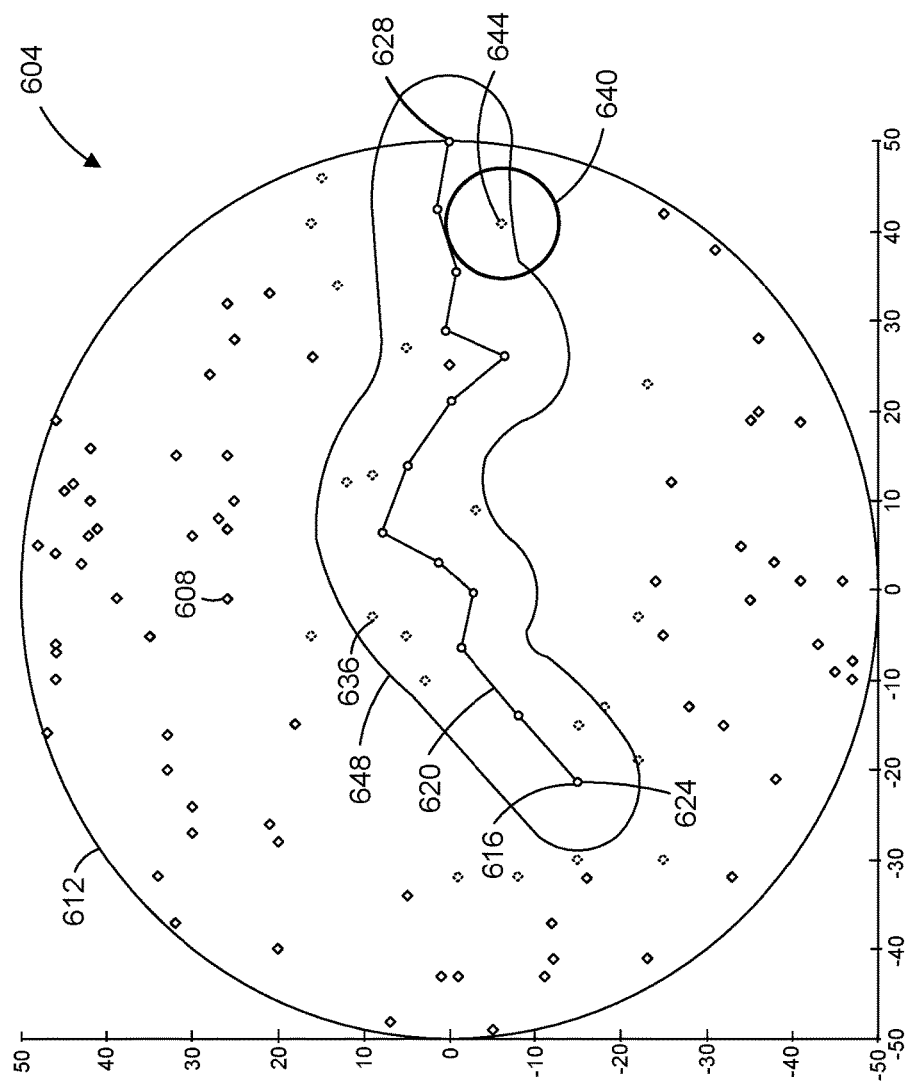

For example, referring to FIGS. 15A-15B, charts 600, 604 are depicted showing the results of a design structure output of a simulation of an area denial system, such as design structure 504 as described above with reference to FIG. 14. Specifically, charts 600, 604 are a computer program output of a MATLAB® simulation of an area denial system generated by code/algorithms included in Appendix A and Appendix B, respectively, and incorporated herein by reference. In various embodiments the code/algorithms included in Appendix A and Appendix B are elements of a computer program product, as described above, as program instructions embodied in a computer readable storage medium. As such, Appendix A and Appendix B can be referred to a program instruction means for implementing various simulations of embodiments described herein and as described below with reference to FIGS. 15A-15B.

In one or more embodiments charts 600, 604 show a simulated area denial system including a plurality of munitions 608 that are pseudo-randomly placed within a 100 m×100 m area to define an obstacle field 612. A target 616 is simulated moving through the obstacle field 612 along a pseudo-randomly generated path 620. As depicted in FIGS. 15A-15B, the target 616 is generated starting at point 624 in the middle right of the obstacle field 612.

The target 616 is simulated for a period of time, during which the target 616 travels along the pseudo-randomly generated path 620. Depicted in FIGS. 15A and 15B, the target 616 is simulated for thirty seconds, during which the target 616 travels from point 624 to end point 628. However, in various embodiments, target 616 could be simulated to travel along the path 620 for a greater or shorter amount of time.

Referring to FIG. 15A, an uncertainly circle 632, or predicted position area, is generated for the target 616 at various points along the path 620. As described above, the circle 632 depicts an area of uncertainty with regard to the actual location of the target 616 as detected by one or more sensor devices. As described above, the size of the uncertainty circle can vary, and in one or more embodiments, depends on the target's velocity and/or the communication latency of the system. For example, depicted in FIG. 15A, the uncertainty circles 632 are depicted assuming intruder's velocity is 3 m/s with a communication latency of 2.5 seconds.

The dashed diamonds 636 indicate the munitions 608 which are closest to the target path 636. For example, a lethality circle 640 is depicted showing a lethal area that intersects with the one or more of the uncertainty circles 632 along the target path 620, if munition 644 were to be fired at that location. In various embodiments, these dashed diamonds 636 could be selected as recommended munitions for transmission to a human operator for authorization to fire. As described above, upon receiving authorization command from the human operator, a gateway device, or other device in the area denial system, could filter through the authorization messages to determine which authorization message should be transmitted based on, relatively latency free sensor data on the target 616.

Referring to FIG. 15B, instead of an uncertainty circle 632, as depicted in FIG. 15A, FIG. 15B includes an uncertainly zone 648 that is generated for the target 616 along the entirety of the target path 620. Similarly to the uncertainty circle, the uncertainty zone depicts an area of uncertainty with regard to the actual location of the target 616 in the obstacle field. As described above, the size of the uncertainty zone may depend on the communication latency and/or target velocity. For example, in certain embodiments, the greater the communication latency, the greater the size of the uncertainty zone.

Figure 16:
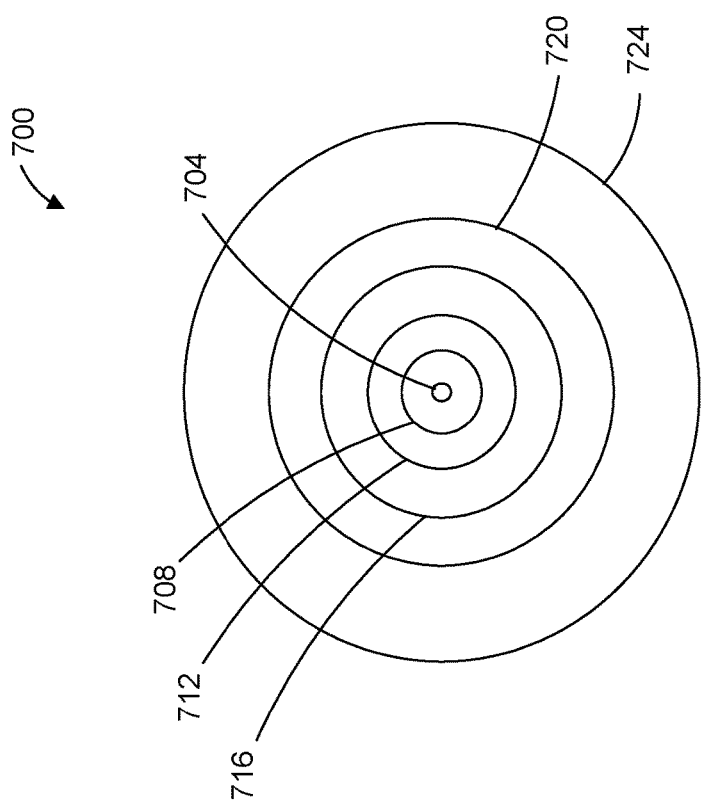
FIG. 16 depicts munition lethality probabilities for a munition, according to one or more embodiments.

Referring to FIG. 16, a diagram 700 depicting munition lethality probability is depicted, according to one or more embodiments. The diagram 700 includes a munition 704 having a plurality of circular lethality zones 708 which are centered on the munition 708. These lethality zones 708 depict various distances from the munition 704 that achieve a particular probability of lethality when the munition 704 engages a target within a certain distance. For example, in certain embodiments, munition 704 includes zones 708, 712, and 716 that depict distances of approximately 2 m, 4 m, and 7 m from the munition 708. In certain embodiments, zones 708, 712, and 716 comprise zones which have a lethality probability of over 90%, a relatively high probability of lethality. In addition, munition includes zones 720 and 724 which depict ranges from the munition 704 of approximately 10 m and 15 m respectively. In various embodiments, these zones 720, 724 are increasingly distant from the munition 704, and thus comprise zones with a lower probability of lethality, for example of at least 70%.

Referring to the FIGS above, in various embodiments, a gateway device can include data of the type of munitions in an area denial system and the lethality zones for each of the munitions. As such, in various embodiments, a gateway device could utilize data on the target's proximity to a munition and data on the lethality zones of the munition to determining the various conditions/rules of an authorization filter. For example, in various embodiments, if a target is positioned in a lethality zone having a lethality probability of at least 90% then the authorization filter could approve transmission of authorization commands through the gateway device to one or more munitions networked downstream.

FIGS. 1A-10 depict a sequence of events for an enemy combatant. If prior to the enemy's arrival the SA operator determined a noncombatant was approaching the obstacle the operators could keep the field in a safe passage state. The noncombatant could move through the obstacle field 124 and cross the bridge 124 without incident. Same would be true for friendly forces passing through the obstacle field 124. The command and control operator could also issue a less than lethal effect to warn the noncombatant they were approaching the obstacle field 124.

Figure 17:
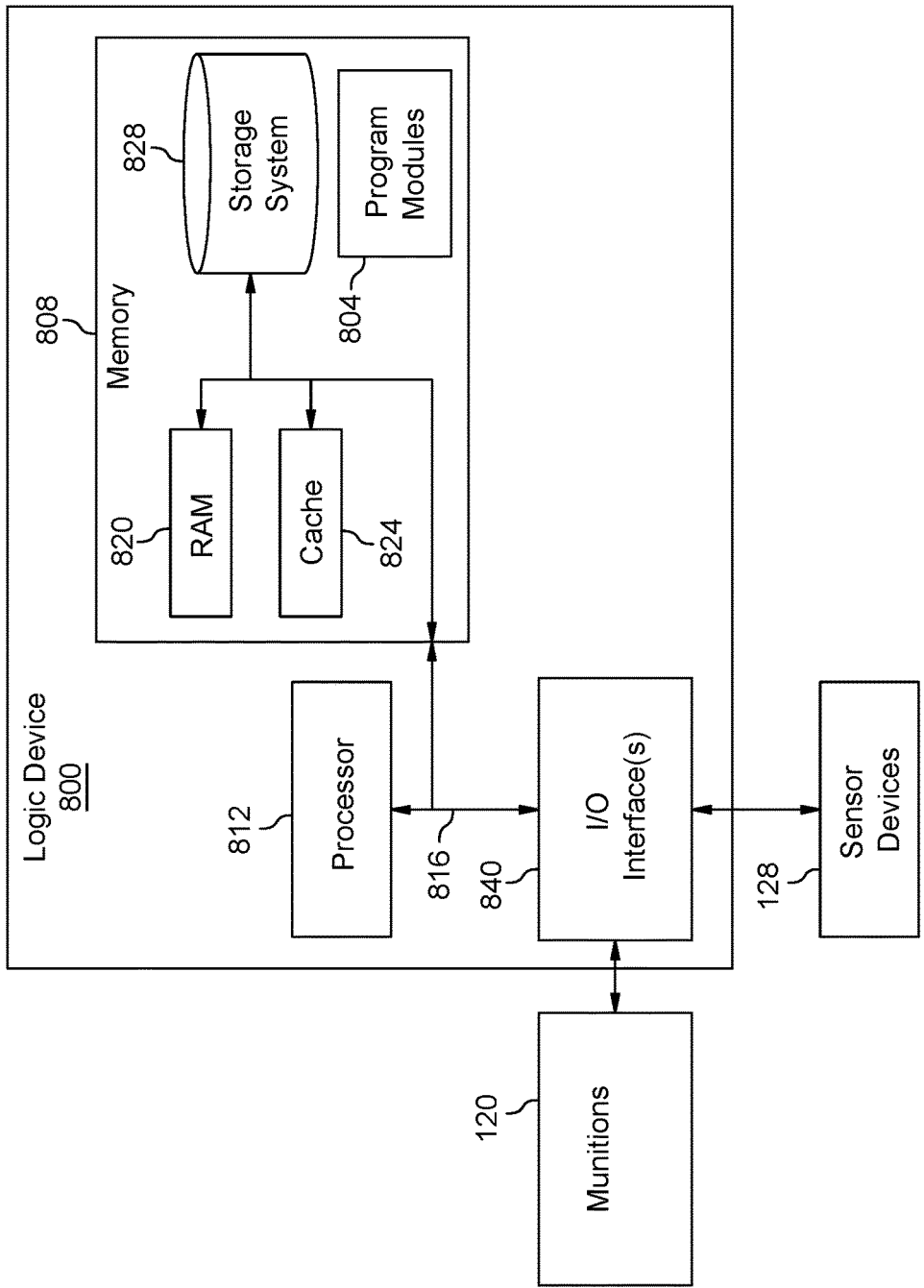
FIG. 17 depicts a block diagram of a logic device for use in a command and control unit and/or gateway devices, according to one or more embodiments.

Referring to FIG. 17 a logic device 800 including a processor and a computer readable storage unit are depicted, according to one or more embodiments of the disclosure. In various embodiments logic device 800 is for use in a command and control unit 156 and/or a gateway device 136 for executing various embodiments of the disclosure as described above. For example, and as described herein, logic device 800 can be configured to execute and/or store various program instructions as a part of a computer program product. Logic device 800 may be operational with general purpose or special purpose computing system environments or configurations for area denial, according to one or more of the embodiments herein.

Examples of computing systems, environments, and/or configurations that may be suitable for use with logic device 800 include, but are not limited to, personal computer systems, server computer systems, handheld or laptop devices, multiprocessor systems, mainframe computer systems, distributed computing environments, and the like.

Logic device 800 may be described in the general context of a computer system, including executable instructions, such as program modules 804, stored in system memory 808 being executed by a processor 812. Program modules 804 may include routines, programs, objects, instructions, logic, data structures, and so on, that perform particular tasks or implement particular abstract data types. Program modules 804 may be practiced in distributed computing environments where tasks are performed by remote processing devices that are linked through a network. In a distributed computing environment, program modules 804 may be located in both local and remote computer system storage media including memory storage devices. As such, in various embodiments logic device 800 can be configured to execute various program modules 804 or instructions for executing various embodiments of the disclosure. For example, in various embodiments logic device 800 can be configured to operate munitions for area-denial.

In FIG. 18, logic device 800 is shown in the form of a general-purpose computing device. The components of the logic device 800 may include, but are not limited to, one or more processors 812, memory 808, and a bus 816 that couples various system components, such as, for example, the memory 808 to the processor 812. Bus 816 represents one or more of any of several types of bus structures, including, but not limited to, a memory bus and/or memory controller, a peripheral bus, and a local bus using a suitable of bus architecture.

In one or more embodiments, logic device 800 includes a variety of computer readable media. Such media may be any available media that is accessible by the munition controller 829. In one or more embodiments, computer readable media includes both volatile and non-volatile media, removable media, and non-removable media.

Memory 808 may include computer readable media in the form of volatile memory, such as random access memory (RAM) 820 and/or cache memory 824. Logic device 800 may further include other volatile/non-volatile computer storage media such as hard disk drive, flash memory, optical drives, or other suitable volatile/non-volatile computer storage media. By way of example, storage system 828, can be provided for reading from and writing to a non-removable, non-volatile media. Described further herein, memory 808 may include at least one program product having a set (e.g., at least one) of program modules 804 or instructions that are configured to carry out the functions of embodiments of the disclosure.

Logic device 800 may also communicate with one or more external devices such as sensor devices 128, munitions 120, or other devices, via an I/O interface(s) 840 for transmitting and receiving sensor data, instructions, or other information to and from the logic device 800. In one or more embodiments I/O interface 840 includes a transceiver for wireless communication. As such, in one or more embodiments, I/O interface 840 can communicate with munitions, and/or other devices in an area denial system via wireless communication.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For example, the steps illustrated in the flowcharts do necessarily require the steps to be performed in accord with the order of the specific blocks unless the claims so limit the steps. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for communication latency compensation in an area denial system deployed in a region, the area denial system including a plurality of munitions defining an obstacle field, one or more sensor devices, and a command and control unit, networked together, via one or more gateway devices, in an area denial network having a command and control latency for communication between the command and control unit and the remainder of the area denial system, the method comprising:
    detecting, using the one or more sensor devices, a target for the area denial system, the detecting including determining a first target position relative to the obstacle field;
    determining a first predicted position area for the target, the first predicted position area indicating a range of possible locations for the target using the command and control latency and using the first target position;
    determining one or more recommended munitions of the plurality of munitions, the one or more recommended munitions determined using the first predicted position area for the target;
    notifying one or more human operators, via the command control unit, of the one or more recommended munitions;
    receiving, from at least one of the one or more human operators, via the command and control unit, authorization to fire one or more munitions of the plurality of munitions, the one or more authorized munitions at least partially selected from the one or more recommended munitions;
    determining a second target position relative to the obstacle field, the second target position detected using the one or more sensor devices; and
    determining that the second target position is outside of a threshold distance from a first authorized munition of the one or more authorized munitions, and in response, de-authorizing the first authorized munition.

2. The method of claim 1, further comprising:
    notifying, using the command and control unit, the one or more human operators of the first predicted position area.

3. The method of claim 1, wherein the second target position is determined using the one or more gateway devices and determined subsequent to receiving authorization to fire one or more munitions of the plurality of munitions.

4. The method of claim 1, wherein de-authorizing the authorized munition is executed automatically using at least one of the one or more gateway devices.

5. The method of claim 1, wherein the second target position is determined without communication to the command and control unit.

6. The method of claim 1, wherein the first predicted position area for the target is determined using the command and control unit.

7. The method of claim 1, wherein the one or more recommended munitions are further determined by using an engagement range of each of the plurality of munitions.

8. The method of claim 1, further comprising:
    determining that the second target position is within a threshold distance from a second authorized munition of the one or more authorized munitions, and in response, maintaining the authorization of the second authorized munition.

9. The method of claim 1, wherein the authorization to arm one or more munitions of the plurality of munitions is received at the one or more gateway devices.

10. The method of claim 1, further comprising:
    determining that the second target position is within a threshold distance of a second authorized munition of the one or more authorized munitions, and in response, transmitting the authorization to the second authorized munition of the one or more authorized munitions from the one or more gateway devices.

11. The method of claim 1, wherein the command and control latency is in a range between and including 0.2 seconds to 5 seconds.

12. The method of claim 1, wherein the command and control unit is positioned away from the obstacle field a distance substantially in a range between 10 kilometers to 200 kilometers.

13. The method of claim 1, wherein the first predicted position area for the target further indicates a position for the target compensated for a two way data latency.

14. A computer program product for communication latency compensation in an area denial system deployed in a region, the area denial system including a plurality of munitions defining an obstacle field, one or more sensor devices, and a command and control unit, networked together, via one or more gateway devices, in an area denial network having a command and control latency for communication between the command and control unit and the remainder of the area denial system, the computer program product comprising:
    a computer readable storage medium having program instructions embodied therewith, wherein the computer readable storage medium is not a transitory signal per se, the program instructions executable by a processor, the program instructions comprising:
        authorization filter means to receive authorization messages to fire one or more munitions of the plurality of munitions;
        authorization filter means to receive target sensor data from the one or more sensor devices;
        authorization filter means to determine a predicted position area for the target, the predicted position area using the target sensor data; and
        authorization filter means to determine that the predicted position area is outside a threshold distance from a first authorized munition of the one or more authorized munitions, and in response, de-authorize the first authorized munition.

15. The computer program product of claim 14, wherein the program instructions further comprise:
authorization filter means to determine that the predicted position area is within a threshold distance of a second authorized munition of the one or more authorized munitions, and in response, transmit the authorization to the second authorized munition.

16. An area denial system for deployment in a region, the area denial system comprising:
a plurality of munitions;
one or more sensor devices;
a command and control unit; and
one or more gateway devices; wherein the plurality of munitions, the one or more sensor devices and the command and control unit are configured to be networked together via the one or more gateway devices in an area denial network having a command and control latency for communication between the command and control unit and the remainder of the area denial system;
wherein the command and control unit, and the one or more gateway devices, each include a processor and a computer readable storage medium communicatively connected to the processor, the computer readable storage mediums having program instructions embodied therewith, wherein each of the computer readable storage mediums is not a transitory signal per se, the program instructions executable by the respective processors to cause the respective processors to:
detect, using the one or more sensor devices, a target for the area denial system, the detecting including determining a first target position relative to the obstacle field;
determine a first predicted position area for the target, the first predicted position area indicating a range of possible locations for the target using the command and control latency and using the first target position;
determine one or more recommended munitions of the plurality of munitions, the one or more recommended munitions determined using the first predicted position area for the target;
notify one or more human operators, via the command and control unit, of the one or more recommended munitions;
receive from at least one of the one or more human operators, via the command and control unit, authorization to arm one or more munitions of the plurality of munitions;
determine a second predicted position area for the target, the second predicted position area using a second detected target position; and
determine that the second predicted location area is outside a threshold distance from a first authorized munition of the one or more authorized munitions, and in response, de-authorizing the first authorized munition.

17. The system of claim 16, wherein the first predicted position area for the target further indicates a position for the target compensated for a two way data latency.

18. The system of claim 16, wherein the command and control latency is substantially in a range between 0.2 seconds to 5 seconds.

19. The system of claim 16, wherein:
the plurality of munitions, the one or more sensor devices, the command and control unit, the one or more gateway devices, and the target for the area denial system are represented by a design structure encoded on a second computer readable storage medium, the design structure comprising elements that are accessible by a computing device for an area denial simulation.

20. The system of claim 19, wherein the design structure elements comprise:
program instruction means to simulate detecting the target for the area denial system, using the one or more sensor devices, the detecting including determining a first target position relative to the obstacle field;
program instruction means to simulate determining a first predicted position area for the target, the first predicted position area indicating a range of possible locations for the target using the command and control latency and using the first target position;
program instruction means to simulate receiving from a human operator via the command and control unit, authorization to arm one or more munitions of the plurality of munitions;
program instruction means to simulate determining a second predicted position area for the target, the second predicted position area using a second detected target position; and
program instruction means to simulate determining that the second predicted location area is outside a threshold distance from a first authorized munition of the one or more authorized munitions, and in response, de-authorizing the first authorized munition.

* * * * *